United States Patent
Layman et al.

(10) Patent No.: US 11,001,693 B2
(45) Date of Patent: *May 11, 2021

(54) METHOD FOR SEPARATING AND PURIFYING POLYMERS FROM RECLAIMED PRODUCT

(71) Applicant: The Procter & Gamble Company, Cincinnati, OH (US)

(72) Inventors: John Moncrief Layman, Liberty Township, OH (US); Dimitris Ioannis Collias, Mason, OH (US); Hans Schonemann, Newburyport, MA (US); Kara Williams, South Weymouth, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,270

(22) Filed: Aug. 30, 2019

(65) Prior Publication Data

US 2020/0062922 A1 Feb. 27, 2020

Related U.S. Application Data

(63) Continuation of application No. 15/839,935, filed on Dec. 13, 2017, now Pat. No. 10,435,532.

(60) Provisional application No. 62/436,510, filed on Dec. 20, 2016.

(51) Int. Cl.
*C08J 11/08* (2006.01)
*C08J 11/06* (2006.01)

(52) U.S. Cl.
CPC ............... *C08J 11/08* (2013.01); *C08J 11/06* (2013.01); *C08J 2301/02* (2013.01); *C08J 2323/06* (2013.01); *C08J 2323/12* (2013.01); *C08J 2333/02* (2013.01); *C08J 2367/02* (2013.01); *Y02W 30/62* (2015.05)

(58) Field of Classification Search
CPC ... C08J 11/06; C08J 11/08; C08J 11/00; C08J 2301/02; C08J 2367/02; C08J 2323/12; C08J 2333/06
See application file for complete search history.

(56) References Cited

U.S. PATENT DOCUMENTS

| | | | |
|---|---|---|---|
| 2,914,453 A | 11/1959 | Wennerberg | |
| 2,978,442 A | 4/1961 | Nixon | |
| 3,001,977 A | 9/1961 | Wisseroth | |
| 5,198,471 A | 3/1993 | Nauman | |
| 5,555,588 A | 9/1996 | Viesehon | |
| 5,739,270 A | 4/1998 | Farmer | |
| 5,994,417 A | 11/1999 | Roberts | |
| 6,223,904 B1 | 5/2001 | Stephan | |
| 7,935,736 B2 | 5/2011 | Maeurer | |
| 9,695,259 B2 * | 7/2017 | Layman | C08J 11/08 |
| 9,803,035 B2 * | 10/2017 | Layman | C08F 10/06 |
| 9,834,621 B2 * | 12/2017 | Layman | C08F 6/00 |
| 9,890,225 B2 | 2/2018 | Layman | |
| 9,982,066 B2 * | 5/2018 | Layman | B29B 17/02 |
| 10,435,532 B2 * | 10/2019 | Layman | C08J 11/06 |
| 10,442,912 B2 * | 10/2019 | Layman | C08J 11/08 |
| 10,450,436 B2 * | 10/2019 | Layman | C08J 11/08 |
| 10,465,058 B2 * | 11/2019 | Layman | C08J 11/06 |
| 2001/0044520 A1 | 11/2001 | Suzuki | |
| 2002/0128394 A1 | 9/2002 | Gorski et al. | |
| 2017/0002109 A1 | 1/2017 | Layman | |
| 2017/0002110 A1 | 1/2017 | Layman | |
| 2017/0002111 A1 | 1/2017 | Layman | |
| 2017/0002115 A1 | 1/2017 | Layman | |
| 2017/0002116 A1 | 1/2017 | Layman | |
| 2017/0002117 A1 | 1/2017 | Layman | |
| 2017/0002118 A1 | 1/2017 | Layman | |
| 2017/0002119 A1 | 1/2017 | Layman | |
| 2018/0171094 A1 | 6/2018 | Layman | |
| 2018/0171095 A1 | 6/2018 | Layman | |
| 2018/0171096 A1 | 6/2018 | Layman | |
| 2018/0171097 A1 | 6/2018 | Layman | |
| 2019/0390031 A1 | 12/2019 | Layman | |
| 2019/0390032 A1 | 12/2019 | Layman | |
| 2019/0390033 A1 | 12/2019 | Layman | |
| 2019/0390034 A1 * | 12/2019 | Layman | C08J 11/08 |

FOREIGN PATENT DOCUMENTS

| | | |
|---|---|---|
| EP | 0849312 A1 | 6/1998 |
| JP | H11263870 A | 9/1999 |
| JP | 3579099B2 B2 | 7/2004 |
| JP | 3669803B2 B2 | 4/2005 |

OTHER PUBLICATIONS

International Search Report and Written Opinion, U.S. Appl. No. 16/423,236, dated Sep. 6, 2019, 10 pgs.
All Office Actions, U.S. Appl. No. 15/839,935.
14638M European Search Report for 17207718.20-01107 dated Mar. 8, 2018.
All Office Actions; U.S. Appl. No. 16/423,236.

* cited by examiner

*Primary Examiner* — Sanza L. McClendon
(74) *Attorney, Agent, or Firm* — James E Oehlenschlager

(57) ABSTRACT

A method for separating and purifying polymers of a reclaimed product (rP) is disclosed. The rP is contacted at an elevated temperature and pressure, with an extraction solvent to produce an extracted rP (erP). A solvent, at conditions sufficient to solubilize the first polymer, contacts the erP to produce a solution, which is purified at an elevated temperature and pressure by contacting it with a solid medium to produce a purified solution of the first polymer. The purified polymer is then separated from the purified solution, and the method steps are repeated until all polymers are separated and purified.

17 Claims, 2 Drawing Sheets

METHOD FOR SEPARATING AND PURIFYING POLYMERS FROM RECLAIMED PRODUCT

FIELD OF THE INVENTION

The present invention generally relates to a method for separating and purifying polymers from a reclaimed product (rP) with the use of heated and pressurized solvent, and solid medium. More specifically, the separated and purified polymers are colorless or clear, odor-free, and virgin-like polymers. Reclaimed film (rF) and reclaimed absorbent hygiene product (rAHP) are examples of rP which contain at least two polymers and can be post-consumer and/or post-industrial use products. The method is particularly useful for the separation and purification of adhesives (ADH), thermoplastic elastomers (TPE), polypropylene (PP), polyethylene (PE), polyester, cellulose, and poly(acrylic acid) (PAA) from rAHP.

BACKGROUND OF THE INVENTION

Polymers, especially synthetic plastics, are ubiquitous in daily life due to their relatively low production costs and good balance of material properties. Synthetic plastics are used in a wide variety of applications, such as packaging, automotive components, medical devices, and consumer goods. To meet the high demand of these applications, tens of billions of pounds of synthetic plastics are produced globally on an annual basis. The overwhelming majority of synthetic plastics are produced from increasingly scarce fossil sources, such as petroleum and natural gas. Additionally, the manufacturing of synthetic plastics from fossil sources produces $CO_2$ as a by-product, which is a potent greenhouse gas.

The ubiquitous use of synthetic plastics has consequently resulted in millions of tons of plastic waste being generated every year. While the majority of plastic waste is landfilled via municipal solid waste programs, a significant portion of plastic waste is found in the environment as litter, which is unsightly and potentially harmful to ecosystems. Plastic waste is often washed into river systems and ultimately out to sea.

Plastics recycling has emerged as one solution to mitigate the issues associated with the wide-spread usage of plastics. Recovering and re-using plastics diverts waste from landfills and reduces the demand for virgin plastics made from fossil-based resources, which consequently reduces greenhouse gas emissions. In developed regions, such as the United States and the European Union, rates of plastics recycling are increasing due to greater awareness by consumers, businesses, and industrial manufacturing operations. The majority of recycled materials, including plastics, are mixed into a single stream which is collected and processed by a material recovery facility (MRF). At the MRF, materials are sorted, washed, and packaged for resale. Plastics can be sorted into individual materials, such as high-density polyethylene (HDPE) or poly(ethylene terephthalate) (PET), or mixed streams of other common plastics, such as PP, low-density polyethylene (LDPE), poly(vinyl chloride) (PVC), polystyrene (PS), polycarbonate (PC), and polyamides (PA). The single or mixed streams can then be further sorted, washed, and reprocessed into pellets that are suitable for re-use in plastics processing, for example blow and injection molding.

Though recycled plastics are sorted into predominately uniform streams and are washed with aqueous and/or caustic solutions, the final reprocessed pellets often remain highly contaminated with unwanted waste impurities, such as spoiled food residue and residual perfume components. In addition, recycled plastic pellets, except for those from recycled beverage containers, are darkly colored due to the mixture of dyes and pigments commonly used to color plastic articles. While there are some applications that are insensitive to color and contamination (for example black plastic paint containers and concealed automotive components), the majority of applications require non-colored pellets. The need for high quality, "virgin-like" recycled resin is especially important for food and drug contact applications, such as food packaging. In addition to being contaminated with impurities and mixed colorants, many recycled resin products are often heterogeneous in chemical composition and may contain a significant amount of polymeric contamination, such as PE contamination in recycled PP and vice versa.

Mechanical recycling, also known as secondary recycling, is the process of converting recycled plastic waste into a re-usable form for subsequent manufacturing. A more detailed review of mechanical recycling and other plastics recovery processes is presented in S. M. Al-Salem, P. Lettieri, and J. Baeyens, "Recycling and recovery routes of plastic solid waste (PSW): A review", Waste Management, Volume 29, Issue 10, October 2009, Pages 2625-2643, ISSN 0956-053X. While advances in mechanical recycling technology have improved the quality of recycled polymers to some degree, there are fundamental limitations of mechanical decontamination approaches, such as the physical entrapment of pigments within a polymer matrix. Thus, even with the improvements in mechanical recycling technology, the dark color and high levels of chemical contamination in currently available recycled plastic waste prevent broader usage of recycled resins by the plastics industry.

To overcome the fundamental limitations of mechanical recycling, there have been many methods developed to purify contaminated polymers via chemical approaches, or chemical recycling. Most of these methods use solvents to decontaminate and purify polymers. The use of solvents enables the extraction of impurities and the dissolution of polymers, which further enables alternative separation technologies.

For example, U.S. Pat. No. 7,935,736 describes a method for recycling polyester from polyester-containing waste using a solvent to dissolve the polyester prior to cleaning. The '736 patent also describes the need to use a precipitant to recover the polyester from the solvent.

In another example, U.S. Pat. No. 6,555,588 describes a method to produce a polypropylene blend from a plastic mixture that comprises other polymers. The '588 patent describes the extraction of contaminants from a polymer at a temperature below the dissolution temperature of the polymer in the selected solvent, such as hexane, for a specified residence time period. The '588 patent further describes increasing the temperature of the solvent (or a second solvent) to dissolve the polymer prior to filtration. The '588 patent yet further describes the use of shearing or flow to precipitate PP from solution. The PP blend described in the '588 patent contained PE contamination up to 5.6 wt %.

In another example, European Patent Application No. 849,312 (translated from German to English) describes a process to obtain purified polyolefins from a polyolefin-containing plastic mixture or a polyolefin-containing waste. The '312 patent application describes the extraction of polyolefin mixtures or wastes with a hydrocarbon fraction of gasoline or diesel fuel with a boiling point above 90° C. at temperatures between 90° C. and the boiling point of the hydrocarbon solvent. The '312 patent application further describes contacting a hot polyolefin solution with bleaching clay and/or activated carbon to remove foreign components from the solution. The '312 patent yet further describes cooling the solution to temperatures below 70° C. to crystallize the polyolefin and then removing adhering solvent by heating the polyolefin above the melting point of the polyolefin, or evaporating the adhering solvent in a vacuum or passing a gas stream through the polyolefin precipitate, and/or extraction of the solvent with an alcohol or ketone that boils below the melting point of the polyolefin.

In another example, U.S. Pat. No. 5,198,471 describes a method for separating polymers from a physically commingled solid mixture (for example, waste plastics) containing a plurality of polymers using a solvent at a first lower temperature to form a first single phase solution and a remaining solid component. The '471 patent further describes heating the solvent to higher temperatures to dissolve additional polymers that were not solubilized at the first lower temperature. The '471 patent describes filtration of insoluble polymer components.

In another example, U.S. Pat. No. 5,233,021 describes a method of extracting pure polymeric components from a multi-component structure (for example, waste carpeting) by dissolving each component at an appropriate temperature and pressure in a supercritical fluid and then varying the temperature and/or pressure to extract particular components in sequence. However, similar to the '471 patent, the '021 patent only describes filtration of undissolved components.

In another example, U.S. Pat. No. 5,739,270 describes a method and apparatus for continuously separating a polymer component of a plastic from contaminants and other components of the plastic using a co-solvent and a working fluid. The co-solvent at least partially dissolves the polymer and the second fluid (that is in a liquid, critical, or supercritical state) solubilizes components from the polymer and precipitates some of the dissolved polymer from the co-solvent. The '270 patent further describes the step of filtering the thermoplastic-co-solvent (with or without the working fluid) to remove particulate contaminants, such as glass particles.

The known solvent-based methods to purify contaminated polymers, as described above, do not produce "virgin-like" polymer. In the previous methods, co-dissolution and thus cross contamination of other polymers often occurs. If adsorbent is used, a filtration and/or centrifugation step is often employed to remove the used adsorbent from solution. In addition, isolation processes to remove solvent, such as heating, vacuum evaporation, and/or precipitation using a precipitating chemical are used to produce a polymer free of residual solvent.

Furthermore, absorbent hygiene products (AHP), such as baby diapers, feminine protection pads, and adult incontinence pads, and product and packaging films (F) are typically disposed in landfills and not recycled. However, these products contain various polymers, such as in the case of AHP, ADH, TPE, PP, PE, PET, cellulose, and PAA, that can be recycled as individual streams.

Accordingly, a need still exists for an improved solvent-based method to purify contaminated polymers that: uses a solvent that is readily and economically removed from the polymer; is relatively simple in terms of the number of unit operations; produces a polymer without a significant amount of polymeric cross contamination; produces a polymer that is essentially colorless; and produces a polymer that is essentially odorless. Also, there is a need to separate and purify the various polymers that constitute rAHP and rF, so that these separated and purified polymers can be used again in the manufacture of AHP and F, or other applications.

SUMMARY OF THE INVENTION

In one embodiment of the present invention, a method for separating and purifying polymers from a reclaimed product (rP) is provided, wherein said rP comprises said polymers and contaminants; wherein said polymer comprises a base polymer, particulate additives associated with said polymer, and extractable materials associated with said polymer; wherein said particulate additives associated with each polymer are dispersed in said base polymer at a concentration; wherein said polymer is selected from the group consisting of a dissolvable polymer, a non-dissolvable polymer, and mixtures thereof; wherein said contaminants comprise particulate matter associated with said contaminants and extractable materials associated with said contaminants; wherein said extractable materials in said rP comprise said extractable materials associated with said polymers and said extractable materials associated with said contaminants; and wherein said extractable materials in said rP are at a concentration in said rP. Said method comprises: (a) obtaining said rP; wherein said rP is selected from the group consisting of post-consumer use products, post-industrial use products, and combinations thereof; (b) extracting said rP with an extraction solvent at a temperature greater than about 100° C. and at a pressure greater than about 150 psig (1 MPa); wherein said extraction solvent has a standard boiling point less than about 70° C.; whereby an extracted rP (erP) is produced; and wherein said extractable materials have a concentration in said erP which is lower than said concentration of said extractable materials in said rP; (c) dissolving a first dissolvable base polymer of said rP by contacting said erP with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable polymer, and domains of all remaining polymers in a first dissolvable base polymer solution; and wherein said first dissolvable base polymer has a solubilization range below the solubilization range of the remaining dissolvable base polymers; (d) settling said initial suspension at a temperature range and a pressure range sufficient to produce a collection of settled particulate additives and said domains of all remaining polymers, and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution; (e) purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution; (f) separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rP; and (g) repeating steps b (extracting step), c (dissolving step), d (settling step), e (purifying step), and f (separating step) with each collection of settled particulate additives and said domains of all remaining polymers from the previous repeat of steps b through f to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range to the highest solubilization range until each individual dissolvable polymer from said rP is produced in its separated and purified form and a final collection of settled particulate additives and said domains of all non-dissolvable base polymers is produced.

In another embodiment of the present invention, a method for separating and purifying ADH, TPE, PP, PE, PET, cellulose, and PAA polymers from a reclaimed absorbent hygiene product (rAHP) is provided, wherein said rAHP comprises said polymers and contaminants; wherein each said polymer comprises a base polymer, particulate additives associated with each said polymer, and extractable materials associated with each said polymer; wherein said particulate additives associated with each said polymer are dispersed in each said base polymer at a concentration; wherein each said polymer is selected from the group consisting of a dissolvable polymer, a non-dissolvable polymer, and mixtures thereof; wherein said contaminants comprise particulate matter associated with said contaminants and extractable materials associated with said contaminants; wherein said extractable materials in said rAHP comprise said extractable materials associated with said polymers and said extractable materials associated with said contaminants; and wherein said extractable materials in said rAHP are at a concentration in said rAHP. Said method comprises: (a) obtaining said rAHP; wherein said rAHP is selected from the group consisting of post-consumer use products, post-industrial use products, and combinations thereof; (b) extracting said rAHP with an extraction solvent at a temperature greater than about 100° C. and at a pressure greater than about 150 psig (1 MPa); wherein said extraction solvent has a standard boiling point less than about 70° C.; whereby an extracted rAHP (erAHP) is produced; and wherein said extractable materials have a concentration in said erAHP which is lower than the concentration of said extractable materials in said rAHP; (c) dissolving said ADH base polymer of said rAHP by contacting said erAHP with a dissolving step solvent at a temperature range and a pressure range sufficient to cause said ADH base polymer to solubilize in said dissolving step solvent; whereby producing an initial suspension; wherein said initial suspension comprises a suspension of said particulate additives associated with said ADH polymer and domains of TPE, PP, PE, PET, cellulose, and PAA polymers in an ADH base polymer solution; and wherein said ADH base polymer has a solubilization range below the solubilization range of said TPE, PP, PE, and PET base polymers; (d) settling said initial suspension at a temperature range and a pressure range sufficient to produce a collection of settled particulate additives and said domains of TPE, PP, PE, PET, cellulose, and PAA polymers, and an intermediate suspension; wherein said collection of settled particulate additives comprises particulate additives associated with said ADH polymer; and wherein said intermediate suspension comprises a suspension of non-settled particulate additives associated with said ADH polymer in said ADH base polymer solution; (e) purifying said intermediate suspension with a solid medium at a temperature range and a pressure range sufficient to produce a final suspension; wherein a fraction of said particulate additives associated with said ADH polymer are retained by said solid medium; and wherein said final suspension comprises a suspension of non-retained particulate additives associated with said ADH polymer in said ADH base polymer solution; (f) separating said dissolving step solvent from said final suspension at a temperature range and a pressure range sufficient to produce a separated and purified ADH polymer; and wherein said separated and purified ADH polymer comprises said ADH base polymer and said particulate additives associated with said ADH polymer dispersed in said separated and purified ADH polymer at a concentration lower than said concentration of said particulate additives associated with said ADH polymer in said ADH polymer in said rAHP; and (g) repeating steps b (extracting step), c (dissolving step), d (settling step), e (purifying step), and f (separating step) with each collection of settled particulate additives and said domains of TPE, PP, PE, PET, cellulose, and PAA polymers from the previous repeat of steps b through f to produce separated and purified dissolvable polymers via extracting, dissolving, settling, purifying, and separating said TPE, PP, PE, and PET base polymers singularly and in sequence, proceeding from said TPE base polymer to said PP base polymer, then to said PE base polymer, and finally to said PET base polymer until a separated and purified TPE polymer is produced, a separated and purified PP polymer is produced, a separated and purified PE polymer is produced, a separated and purified TPE polymer is produced, and a final collection of settled particulate additives and said domains of cellulose and PAA polymers is produced.

In yet another embodiment of the present invention, a method for separating and purifying PP, cellulose, and PAA polymers from a reclaimed absorbent hygiene product (rAHP) is provided, wherein said rAHP comprises said polymers and contaminants; wherein said PP polymer comprises a PP base polymer, particulate additives associated with said PP polymer, and extractable materials associated with said PP polymer; wherein said particulate additives associated with said PP polymer are dispersed in said PP base polymer at a concentration; wherein said PP polymer is a dissolvable polymer; wherein said cellulose and said PAA polymers are non-dissolvable polymers; wherein said contaminants comprise particulate matter associated with said contaminants and extractable materials associated with said contaminants; wherein said extractable materials in said rAHP comprise said extractable materials associated with said polymers and said extractable materials associated with said contaminants; and wherein said extractable materials in said rAHP are at a concentration in said rAHP. Said method comprises: (a) obtaining said rAHP; wherein said rAHP is selected from the group consisting of post-consumer use products, post-industrial use products, and combinations thereof; (b) extracting said rAHP with an extraction solvent at a temperature greater than about 100° C. and at a pressure greater than about 150 psig (1 MPa); wherein said extraction solvent has a standard boiling point less than about 70° C.; whereby an extracted rAHP (erAHP) is produced; and wherein said extractable materials have a concentration in said erAHP which is lower than the concentration of said extractable materials in said rAHP; (c) dissolving said PP base polymer of said rAHP by contacting said erAHP with a dissolving step solvent at a temperature range and a pressure range sufficient to cause said PP base polymer to solubilize in said dissolving step solvent; whereby producing an initial suspension; and wherein said initial suspension comprises a suspension of said particulate additives associated with said PP polymer and domains of cellulose and PAA polymers in a PP base polymer solution; (d) settling said initial suspension at a temperature range and a pressure range sufficient to produce a collection of settled particulate additives and said domains of cellulose and PAA polymers, and an intermediate suspension; wherein said collection of settled particulate additives comprises particulate additives associated with said PP polymer; and wherein said intermediate suspension comprises a suspension of non-settled particulate additives associated with said PP polymer in said PP base polymer solution; (e) purifying said intermediate suspension with a solid medium at a temperature range and a pressure range sufficient to produce a final suspension; wherein a fraction of said particulate additives associated with said PP polymer are retained by said solid medium; and wherein said final suspension comprises a suspension of non-retained particulate additives associated with said PP polymer in said PP base polymer solution; (f) separating said dissolving step solvent from said final suspension at a temperature range and a pressure range sufficient to produce a separated and purified PP polymer; and wherein said separated and purified PP polymer comprises said PP base polymer and said particulate additives associated with said PP polymer dispersed in said separated and purified PP polymer at a concentration lower than said concentration of said particulate additives associated with said PP polymer in said PP polymer in said rAHP.

In even yet another embodiment of the present invention, a method for separating and purifying polymers from a reclaimed product (rP) is provided, wherein said rP comprises said polymers and contaminants; wherein said polymer comprises a base polymer, particulate additives associated with said polymer, and extractable materials associated with said polymer; wherein said particulate additives associated with each polymer are dispersed in said base polymer at a concentration; wherein said polymer is selected from the group consisting of a dissolvable polymer, a non-dissolvable polymer, and mixtures thereof; wherein said contaminants comprise particulate matter associated with said contaminants and extractable materials associated with said contaminants; wherein said extractable materials in said rP comprise said extractable materials associated with said polymers and said extractable materials associated with said contaminants; and wherein said extractable materials in said rP are at a concentration in said rP. Said method comprises: (a) obtaining said rP; wherein said rP is selected from the group consisting of post-consumer use products, post-industrial use products, and combinations thereof; (b) reducing the size of said rP to particles with a largest dimension of less than about 10 mm; (c) solids separating each polymer of said rP in a polymer stream, and processing each polymer stream comprising a dissolvable polymer separately in a process comprising: (1) extracting said polymer stream comprising said dissolvable polymer with an extraction solvent at a temperature greater than about 100° C. and at a pressure greater than about 150 psig (1 MPa); wherein said extraction solvent has a standard boiling point less than about 70° C.; whereby an extracted polymer is produced; and wherein said extractable materials have a concentration in said extracted polymer which is lower than said concentration of said extractable materials in said rP; (2) dissolving said dissolvable polymer by contacting said extracted polymer with a dissolving step solvent at a temperature range and a pressure range sufficient to cause said dissolvable base polymer to solubilize in said dissolving step solvent; whereby producing an initial suspension; and wherein said initial suspension comprises a suspension of said particulate additives associated with said first dissolvable polymer; (3) settling said initial suspension at a temperature range and a pressure range sufficient to produce a collection of settled particulate additives and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution; (4) purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution; (5) separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rP.

DETAILED DESCRIPTION OF THE INVENTION

I Definitions

Figure 1:
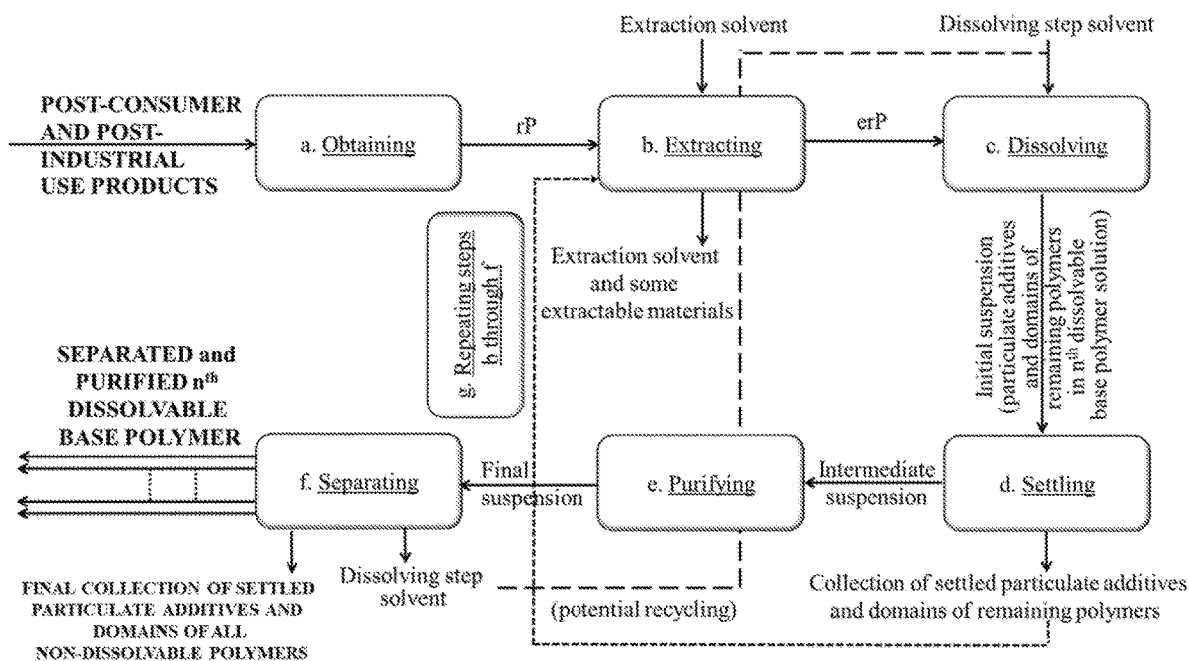
FIG. 1 is a block flow diagram showing the major steps of one embodiment of the present invention.

As used herein, the term "reclaimed product" (rP) refers to a product used for a previous purpose and then recovered for further processing.

As used herein, the term "reclaimed film" (rF) refers to a film used for a previous purpose and then recovered for further processing.

As used herein, the term "reclaimed absorbent hygiene product" (rAHP) refers to an absorbent hygiene product (AHP; e.g. baby diaper, feminine protection product, and adult incontinence product) used for a previous purpose and then recovered for further processing.

As used herein, the term "post-consumer use product" refers to a product that has been used by the end consumer and disposed of in a waste stream.

As used herein, the term "post-industrial use product" refers to a product that has been manufactured but not used by the consumer yet, and it is typically a waste product from the manufacturing process.

As used herein, the term "post-consumer recycle material" (PCR) refers to a material that is produced after the end consumer has used the material and disposed of the material in a waste stream.

As used herein the term "polymer" refers to a material that comprises a base polymer, particulate additives associated with the polymer, and extractable materials associated with the polymer.

As used herein, the term "base polymer" refers to a polymer before any additive packages (either particulate or extractable) are added to it (i.e., the base polymer is unmodified).

As used herein, the term "particulate additives" refers to particles which are added to the base polymer before the polymer or article are sold in the trade. Non limiting examples of such particulate additives that can be used in both cases of dissolvable and non-dissolvable base polymers are clarifiers, flame retardants, fillers, reinforcement, antacids, stabilizers, antioxidants, slid agents, antiblocking agents, lubricants, mold release agents, nucleating agents, and pigments.

As used herein, the term "extractable materials" refers to materials which can be extracted with an extracting solvent.

As used herein, the term "dissolvable polymer" refers to a polymer which is capable of being dissolved in a solvent at the molecular level. Further, the thermodynamic stability of the polymer/solvent solution can be described by the following Equation 1:

$$\Delta G_{mix} = \Delta H_{mix} - T\Delta S_{mix} \qquad \text{Equation 1}$$

where $\Delta G_{mix}$ is the Gibbs free energy change of mixing of the dissolvable polymer with a solvent, $\Delta H_{mix}$ is the enthalpy change of mixing, T is the absolute temperature, and $\Delta S_{mix}$ is the entropy of mixing. To maintain a stable solution of a dissolvable polymer in a solvent, the Gibbs free energy must be negative and at a minimum. Thus, any combination of dissolvable polymer and solvent that minimize a negative Gibbs free energy at appropriate temperature and pressure can be used for the present invention.

As used herein, the term "non-dissolvable polymer" refers to a polymer which cannot be dissolved in a solvent at the molecular level.

As used herein the term "contaminants" refers to unwanted or undesired materials which are present in an rP and were not part of the polymers used to make the product (e.g. contaminants are materials deposited to the product during its use, disposal process, or reclaiming process of the rP). These contaminants comprise particulate matter associated with the contaminants and extractable materials associated with the contaminants.

As used herein, the terms "extraction solvent" and "dissolving step solvent" refer to substances that may exist in the liquid state under specified conditions of temperature and pressure. In some embodiments, the extraction solvent and the dissolving step solvent may have a predominantly homogenous chemical composition of one molecule or isomer, while in other embodiments, the extraction solvent and the dissolving step solvent may be a mixture of several different molecular compositions or isomers. Further, in some embodiments of the present invention, the terms "extraction solvent" and "dissolving step solvent" may also apply to substances that are at, near, or above the critical temperature and critical pressure (critical point) of that substance. It is well known to those having ordinary skill in the art that substances above the critical point of that substance are known as "supercritical fluids" which do not have the typical physical properties (i.e. density) of a liquid.

As used herein, the term "standard boiling point" refers to the boiling temperature at an absolute pressure of exactly 100 kPa (1 bar, 14.5 psia, 0.9869 atm) as established by the International Union of Pure and Applied Chemistry (IUPAC).

As used herein, the term "standard enthalpy change of vaporization" refers to the enthalpy change required to transform a specified quantity of a substance from a liquid into a vapor at the standard boiling point of the substance.

As used herein, the term "polymer solution" refers to a solution of a base polymer dissolved in a solvent.

As used herein, the term "settling" refers to the process of precipitating suspended particles in response to a force (typically a gravitational force) acting upon the particles. For the purposes of the present invention, the terms "settling" and "sedimentation" are used interchangeably.

As used herein, the term "solid medium" refers to a substance that exists in the solid state under the conditions of use. The solid medium may be crystalline, semi-crystalline, or amorphous. The solid medium may be granular and may be supplied in different shapes (i.e. spheres, cylinders, pellets, etc.). If the solid medium is granular, its particle size and particle size distribution may be defined by the mesh size used to classify the granular media. An example of standard mesh size designations can be found in the American Society for Testing and Material (ASTM) standard ASTM E11 "Standard Specification for Woven Wire Test Sieve Cloth and Test Sieves." The solid medium may also be a non-woven fibrous mat or a woven textile.

As used herein, the term "purified polymer" refers to a polymer in which the particulate additives and extractable materials have lower concentration than their concentration is in the same polymer prior to the extracting, dissolving, settling, and purifying steps. For the purposes of the present invention, the terms "purified polymer" and "purer polymer" have the same meaning and are used interchangeably.

As used herein, the term "separated and purified polymer" refers to a purified polymer that is separated from the other polymers.

As used herein, the term "extracting" refers to the process of transferring a solute species from a liquid phase (or solid matrix) across a phase boundary to a separate immiscible liquid phase. The driving force(s) for extraction are described by partition theory.

As used herein, the term "extracted" refers to a material having fewer solute species (i.e., extractable materials) relative to the same material prior to an extraction step.

As used here, the term "extracted rAHP" refers to an rAHP having fewer solute species (i.e., extractable materials) relative to the same rAHP prior to an extraction step.

As used herein, the term "virgin-like polymer" refers to a polymer which is essentially free of particulate additives, extractable materials, and contaminants; homogenous; and with similar properties to its base polymer. For the purposes of the present invention, the terms "virgin-like polymer" and "base-polymer" are used interchangeably.

As used herein, the term "oligomeric acrylic acid" (OAA) refers to a molecular complex with less than 1,000 AA units, as opposed to AA polymer (PAA) which refers to a molecular complex with more than 1,000 AA units.

As used herein, the terms "poly(acrylic acid)" and "PAA" refer polymers of acrylic acid used in various applications, such as superabsorbent polymers (SAP), adhesives, coatings, flocculating agents, etc.

As used herein, any reference to international units of pressure (e.g. MPa) refers to gauge pressure.

II Method for Separating and Purifying Polymers

Surprisingly, it has been found that certain solvents, which in a preferred embodiment exhibit temperature and pressure-dependent solubility for polymers, when used in a relatively simple process can cause separation and purification of polymers, especially polymers in reclaimed or recycled products, to a near virgin-like quality. Each of these polymers comprises a base polymer, particulate additives, and extractable materials. The process, exemplified in FIG. 1, comprises obtaining a reclaimed product (step a in FIG. 1), followed by extracting the extractable materials from the reclaimed product with an extracting solvent at an extraction temperature ($T_E$) and at an extraction pressure ($P_E$) (step b in FIG. 1), followed by dissolving the base polymer in a dissolving step solvent at a dissolution temperature ($T_D$) and at a dissolution pressure ($P_D$) (step c in FIG. 1) and forming a suspension of the particulate additives in the base polymer solution, followed by settling the polymer suspension at a dissolution temperature ($T_D$) and at a dissolution pressure ($P_D$) (step d in FIG. 1) and forming a suspension of the particulate additives that have not settled in the previous step in a base polymer solution, followed by purifying the suspension by contacting it with a solid medium at a dissolution temperature ($T_D$) and at a dissolution pressure ($P_D$) (step e in FIG. 1) to reduce the concentration of the particulate additives in the base polymer solution, and followed by separating the polymer from the dissolving step solvent (step f in FIG. 1) producing a separated and purified polymer. Then, the process steps of dissolving, settling, purifying, and separating are repeating for each one of the dissolvable polymers in the reclaimed product.

In one embodiment of the present invention, the separated and purified polymers, which may be sourced from post-consumer waste streams, are essentially particulate-additive-free (e.g. pigment-free), contaminant-free, extractable-materials-free (e.g. odor-free), homogenous, and similar in properties to virgin polymers. Furthermore, in a preferred embodiment of the present invention, the physical properties of the dissolving step solvent of the present invention may enable more energy efficient methods for separating that solvent from the purified polymers.

Reclaimed Product

For the purposes of the present invention, reclaimed product (rP) refers to either product or packaging. Non-limiting examples of post-consumer use products or packaging are products or packaging derived from curbside recycle streams where end-consumers place used products or packaging into a designated bin for collection by a waste hauler or recycler, and products or packaging derived from in-store "take-back" programs where the consumer brings waste products or packaging into a store and places the waste products or packaging in a designated collection bin. A non-limiting example of post-industrial waste products are waste polymers produced during the manufacture or shipment of a good or product that are collected as unusable material by the manufacturer (i.e. trim scraps, out of specification material, start up scrap). Non-limiting examples of waste products from special waste streams are waste products derived from the recycling of electronic waste, also known as e-waste, automobiles, and used carpeting and textiles.

In one embodiment of the present invention, said rP is selected from form the group consisting of post-consumer use products, post-industrial use products, post-commercial use products, special waste streams, and combinations thereof. In another embodiment of the present invention, said rP is selected from the group consisting of post-consumer use products, post-industrial use products, and combinations thereof. In yet another embodiment of the present invention, a method for separating and purifying polymers from a reclaimed product (rP) comprises obtaining said rP.

In even yet another embodiment of the present invention, said rP is a reclaimed film. In one embodiment of the present invention, said rF comprises at least 2 polymers. In another embodiment of the present invention, said rF comprises at least 4 polymers. In yet another embodiment of the present invention, said rF comprises a multilayer film. In even yet another embodiment of the present invention, said rF comprises a film with at least two layers. These layers in the rF can include tie layers, as known to those skilled in the art. Non-limiting examples of the polymers used in the layers of a multilayer film are PE, PP, PET, polystyrene (PS), poly (lactic acid) (PLA), ionomer, polyamides (PA), and polybutylene succinate (PBS).

In one embodiment of the present invention, said rP is a reclaimed adsorbent hygiene product (rAHP). In another embodiment of the present invention, said rAHP is selected from the group consisting of baby diaper, feminine protection product, and adult incontinence product.

In one embodiment of the present invention, said rP comprises said polymers and contaminants. For the purposes of the present invention, the polymers in the reclaimed product are homogenous polymers or mixtures of several different polymer compositions. Non-limiting examples of polymers are PE, PP, PET, ADH, TPE, cellulose, hemicellulose, lignin, PAA, PLA, ionomer, PA, and PBS. Non-limiting examples of PP compositions are homopolymers of propylene, copolymers of propylene and ethylene (including "impact" and "random-clarified" copolymers), copolymers of propylene and alpha-olefins, polypropylene rubbers, and other dissolvable polypropylene compositions that may be apparent to those having ordinary skill in the art. In one embodiment of the present invention, said polymers are dissolvable. In another embodiment of the present invention, said polymers are non-dissolvable. In yet another embodiment of the present invention, said polymer is selected from the group consisting of a dissolvable polymer, a non-dissolvable polymer, and mixtures thereof. In one embodiment of the present invention, said dissolvable polymers are selected from the group consisting of PP, PE, PET, ADH, TPE, and mixtures thereof. In another embodiment of the present invention, said first dissolvable polymer is ADH, said second dissolvable polymer is TPE, said third dissolvable polymer is PP, said fourth dissolvable polymer is PE, and said fifth dissolvable polymer is PET. In yet another embodiment of the present invention, said non-dissolvable polymers are selected from the group consisting of cellulose, hemicellulose, lignin, and PAA, and mixtures thereof. In even yet another embodiment of the present invention, said non-dissolvable polymers are cellulose and PAA.

Non-limiting examples of contaminants are dust particles, soils from the use, disposal, and reclaiming processes of the product, odors, and pieces from other products. In another embodiment of the present invention, said contaminants comprise particulate matter associated with said contaminants and extractable materials associated with said contaminants.

The polymers in the reclaimed product comprise base polymer, particulate additives associated with the polymer, and extractable materials associated with the polymer. The particulate additives are added to the base polymers during polymerization or conversion of the base polymer to the product. Non-limiting examples of the particulate additives are clarifiers, flame retardants, fillers, reinforcements, antacids, stabilizers, antioxidants, slip agents, antiblocking agents, lubricants, mold release agents, nucleating agents, pigments, and plasticizers. Non-limiting examples of pigments are organic pigments, such as copper phthalocyanine, inorganic pigments, such as titanium dioxide, and other pigments that may be apparent to those having ordinary skill in the art. A non-limiting example of an organic dye is B asic Yellow 51. Non-limiting examples of antistatic agents is glycerol monostearate, and slip agents is erucamide. A non-limiting example of a stabilizer is octadecyl-3-(3,5-di-tert.butyl-4-hydroxyphenyl)-propionate. Non-limiting examples of fillers are calcium carbonate, talc, and glass fibers.

In one embodiment of the present invention, said particulate additives are selected from the group consisting of clarifiers, flame retardants, fillers, reinforcements, antacids, stabilizers, antioxidants, slip agents, antiblocking agents, lubricants, mold release agents, nucleating agents, pigments, and mixtures thereof. In another embodiment of the present invention, the particulate additives associated with the polymer are dispersed in said base polymer at a concentration.

In one embodiment of the present invention, said concentration of said particulate additives associated with each dissolvable polymer dispersed in said each dissolvable base polymer in said rP is less than about 5%. In another embodiment of the present invention, said concentration of said particulate additives associated with each dissolvable polymer dispersed in said each dissolvable base polymer in said rP is about 3%. In yet another embodiment of the present invention, said concentration of said particulate additives associated with each dissolvable polymer dispersed in said each dissolvable base polymer in said rP is less than about 3%. In even yet another embodiment of the present invention, said concentration of said particulate additives associated with each dissolvable polymer dispersed in said each dissolvable base polymer in said rP is less than about 1%. In one embodiment of the present invention, said concentration of said particulate additives associated with each dissolvable polymer dispersed in said each dissolvable base polymer in said rP is less than about 0.1%.

In one embodiment of the present invention, said concentration of said particulate additives associated with each dissolvable polymer dispersed in said each dissolvable base polymer in said rAHP is less than about 5%. In another embodiment of the present invention, said concentration of said particulate additives associated with each dissolvable polymer dispersed in said each dissolvable base polymer in said rAHP is about 3%. In yet another embodiment of the present invention, said concentration of said particulate additives associated with each dissolvable polymer dispersed in said each dissolvable base polymer in said rAHP is less than about 3%. In even yet another embodiment of the present invention, said concentration of said particulate additives associated with each dissolvable polymer dispersed in said each dissolvable base polymer in said rAHP is less than about 1%. In one embodiment of the present invention, said concentration of said particulate additives associated with each dissolvable polymer dispersed in said each dissolvable base polymer in said rAHP is less than about 0.1%.

In one embodiment of the present invention, said concentration of said particulate additives associated with PP polymer dispersed in said PP base polymer in said rP is less than about 5%. In another embodiment of the present invention, said concentration of said particulate additives associated with PP polymer dispersed in said PP base polymer in said rP is about 3%. In yet another embodiment of the present invention, said concentration of said particulate additives associated with PP polymer dispersed in said PP base polymer in said rP is less than about 3%. In even yet another embodiment of the present invention, said concentration of said particulate additives associated with PP polymer dispersed in said PP base polymer in said rP is less than about 1%. In one embodiment of the present invention, said concentration of said particulate additives associated with PP polymer dispersed in said PP base polymer in said rP is less than about 0.1%.

In one embodiment of the present invention, said concentration of said particulate additives associated with PP polymer dispersed in said PP base polymer in said rAHP is less than about 5%. In another embodiment of the present invention, said concentration of said particulate additives associated with PP polymer dispersed in said PP base polymer in said rAHP is about 3%. In yet another embodiment of the present invention, said concentration of said particulate additives associated with PP polymer dispersed in said PP base polymer in said rAHP is less than about 3%. In even yet another embodiment of the present invention, said concentration of said particulate additives associated with PP polymer dispersed in said PP base polymer in said rAHP is less than about 1%. In one embodiment of the present invention, said concentration of said particulate additives associated with PP polymer dispersed in said PP base polymer in said rAHP is less than about 0.1%.

In one embodiment of the present invention, said extractable materials in said rP comprise said extractable materials associated with said polymers and said extractable materials associated with said contaminants. In another embodiment of the present invention, said extractable materials in said rP are at a concentration in said rP. Non-limiting examples of extractable materials associated with either the polymers or the contamination are dyes, perfumes, flavors, and mixtures thereof. The extractable materials associated with either the polymers or the contamination may be residual processing aides added to the polymer, residual product formulations which contacted the polymer during the use of the product, and any other extractable materials that may have been intentionally added or unintentionally incorporated into the polymer, for example, during waste collection and subsequent accumulation with other waste products.

In one embodiment of the present invention, said method further comprises sterilizing said rP after said obtaining step. In another embodiment of the present invention, said method further comprises sterilizing said rAHP after said obtaining step. The sterilization is required to eliminate the microbial load on the rP, and more specifically, the rAHP, since the AHP are considered biohazardous products after use. Sterilization processes and conditions are well known to those skilled in the art, and can be done in autoclaves, Parr reactors, and similar equipment.

In one embodiment of the present invention, said method further comprises reducing the size of said rAHP after said obtaining step and before said extracting step. In another embodiment of the present invention, said reducing step comprises milling, cutting, shearing, or mixtures thereof.

In one embodiment of the present invention, said method comprises obtaining said rP, extracting said rP with an extraction solvent, dissolving said first dissolvable base polymer with a dissolving step solvent to produce an initial suspension, settling said initial suspension to produce an intermediate suspension, purifying said intermediate suspension with a solid medium to produce a final suspension, separating said dissolving step solvent from said final suspension to produce a separated and purified first dissolvable polymer; and repeating said dissolving step, said settling step, said purifying step, and said separating step with all remaining dissolvable polymers.

Extracting Step

In one embodiment of the present invention, a method for separating and purifying polymers from a reclaimed product (rP) includes extracting said rP with an extraction solvent at a temperature greater than about 100° C. and at a pressure greater than about 150 psig (1 MPa); wherein said extraction solvent has a standard boiling point less than about 70° C.; whereby an extracted rP (erP) is produced; and wherein said extractable materials have a concentration in said erP which is lower than said concentration of said extractable materials in said rP. In another embodiment of the present invention, said extracting step comprises extracting said rAHP with an extraction solvent at a temperature greater than about 100° C. and at a pressure greater than about 150 psig (1 MPa); wherein said extraction solvent has a standard boiling point less than about 70° C.; whereby an extracted rAHP (erAHP) is produced; and wherein said extractable materials have a concentration in said erAHP which is lower than said concentration of said extractable materials in said rAHP. In yet another embodiment of the present invention, said extracting step comprises extracting said rF with an extraction solvent at a temperature greater than about 100° C. and at a pressure greater than about 150 psig (1 MPa); wherein said extraction solvent has a standard boiling point less than about 70° C.; whereby an extracted rF (erF) is produced; and wherein said extractable materials have a concentration in said erF which is lower than said concentration of said extractable materials in said rF.

The extraction solvent of the present invention has a standard boiling point less than about 70° C. Pressurization maintains extraction solvents, which have standard boiling points below the operating temperature range of the present invention, in a state in which there is little or no solvent vapor. In one embodiment of the present invention, the extraction solvent with a standard boiling point less than about 70° C. is selected from the group consisting of carbon dioxide, ketones, alcohols, ethers, esters, alkenes, alkanes, and mixtures thereof. In another embodiment of the present invention, said extraction solvent is selected from the group consisting of olefinic hydrocarbons, aliphatic hydrocarbons, and mixtures thereof. Non-limiting examples of extraction solvents with standard boiling points less than about 70° C. are carbon dioxide, acetone, methanol, dimethyl ether, diethyl ether, ethyl methyl ether, tetrahydrofuran, methyl acetate, ethylene, propylene, 1-butene, 2-butene, isobutylene, 1-pentene, 2-pentene, branched isomers of pentene, 1-hexene, 2-hexene, methane, ethane, propane, n-butane, isobutane, n-pentane, isopentane, neopentane, n-hexane, isomers of isohexane, and other substances that may be apparent to those having ordinary skill in the art. In one embodiment of the present invention, said extraction solvent in n-butane. In another embodiment of the present invention, said extraction solvent in propane. In yet another embodiment of the present invention, said extraction solvent in pentane. In even yet another embodiment of the present invention, said extraction solvent in hexane.

The selection of the extraction solvent, as well as the dissolving step solvent, used will dictate the temperature and pressure ranges used to perform the steps of the present invention. A review of polymer phase behavior in solvents of the kind described by the present invention is provided in the following reference: Kirby and McHugh. (1999) *Chem. Rev.* 99:565-602.

In one embodiment of the present invention, a method for separating and purifying a polymer from a reclaimed product (rP) includes contacting said rP with an extraction solvent at a temperature and at a pressure wherein said polymer is essentially insoluble in the extraction solvent. Although not wishing to be bound by any theory, applicants believe that the temperature and pressure-dependent solubility can be controlled in such a way to prevent the extraction solvent from fully solubilizing the polymer, however, the extraction solvent can diffuse into the polymer and extract any extractable materials.

In one embodiment of the present invention, the extraction may be accomplished by fixing the temperature of the polymer/extraction solvent system and then controlling the pressure below a pressure, or pressure range, where the polymer dissolves in the extraction solvent. In another embodiment of the present invention, the extraction may be accomplished by fixing the pressure of the polymer/extraction solvent system and then controlling the temperature below a temperature, or temperature range, where the polymer dissolves in the extraction solvent. The temperature and pressure-controlled extraction of the polymer with an extraction solvent uses a suitable pressure vessel and may be configured in a way that allows for continuous extraction of the polymer with the extraction solvent. In one embodiment of the present invention, the pressure vessel may be a continuous liquid-liquid extraction column where molten polymer is pumped into one end of the extraction column and the extraction solvent is pumped into the same or the opposite end of the extraction column. In another embodiment of the present invention, the fluid containing extracted contamination is removed from the process. In another embodiment of the present invention, the fluid containing the extracted materials is purified, recovered, and recycled for use in the extracting step or a different step in the process.

In one embodiment of the present invention, the extracting step may be performed as a batch method, wherein the reclaimed product is fixed in a pressure vessel and the extraction solvent is continuously pumped through the fixed product phase. The extraction time or the amount of the extraction solvent used will depend on the desired purity of the separated and purified polymers and the amount of extractable materials in the starting reclaimed product.

In one embodiment of the present invention, said extracting step is in batch mode. In another embodiment of the present invention, said extracting step is in continuous mode.

In another embodiment of the present invention, the erP is contacted with a solid medium in a separate step as described in the "purifying step" section below. In yet another embodiment of the present invention, said extracting step comprises the use of adsorbent materials to extract a fraction of said extractable materials. Non-limiting examples of adsorbent materials are silicon oxide (silica), silica gel, aluminum oxide (alumina), iron oxide, aluminum silicate, magnesium silicate, amorphous volcanic glass, reclaimed glass, sand, quartz, diatomaceous earth, zeolite, perlite, clay, fuller's earth, bentonite clay, metal organic framework (MOF), covalent organic framework (COF), zeolitic imidazolate framework (ZIF), anthracite coal, carbon black, coke, and activated carbon. In even yet another embodiment of the present invention, said adsorbent materials are selected from the group consisting of activated carbon, zeolite, MOF, COF, (ZIF), and mixtures thereof.

In one embodiment of the present invention, said method includes contacting said rP with an extraction solvent at a temperature and at a pressure wherein said polymers are molten and in the liquid state. In another embodiment of the present invention, said rP is contacted with said extraction solvent at a temperature and at a pressure wherein said polymers are in the solid state.

In one embodiment of the present invention, a method for separating and purifying PP from an rP includes contacting PP with an extraction solvent at a temperature and a pressure wherein PP remains essentially undissolved. In another embodiment of the present invention, a method for separating and purifying PP from an rP includes contacting said PP with n-butane at a temperature from about 80° C. to about 220° C. In yet another embodiment of the present invention, a method for separating and purifying PP from an rP includes contacting said PP with n-butane at a temperature from about 100° C. to about 200° C. In even yet another embodiment of the present invention, a method for separating and purifying PP from an rP includes contacting said PP with n-butane at a temperature from about 130° C. to about 180° C. In one embodiment of the present invention, a method for separating and purifying PP from an rP includes contacting said PP with n-butane at a temperature from about 110° C. to about 170° C.

In one embodiment of the present invention, a method for separating and purifying PP from an rP includes contacting said PP with n-butane at a pressure from about 150 psig (1 MPa) to about 3,000 psig (20.7 MPa). In another embodiment of the present invention, a method for separating and purifying PP from an rP includes contacting said PP with n-butane at a pressure from about 1,000 psig (6.9 MPa) to about 2,750 psig (19 MPa). In yet another embodiment of the present invention, a method for separating and purifying PP from an rP includes contacting said PP with n-butane at a pressure from about 1,500 psig (10.3 MPa) to about 2,500 psig (17.2 MPa). In one embodiment of the present invention, a method for separating and purifying PP from an rP includes contacting said PP with n-butane at a pressure from about 1,100 psig (7.6 MPa) to about 2,100 psig (14.5 MPa).

In one embodiment of the present invention, a method for separating and purifying PP from an rP includes contacting said PP with propane at a temperature from about 80° C. to about 220° C. In another embodiment of the present invention, a method for separating and purifying PP from an rP includes contacting said PP with propane at a temperature from about 100° C. to about 200° C. In yet another embodiment of the present invention, a method for separating and purifying PP from an rP includes contacting said PP with propane at a temperature from about 130° C. to about 180° C.

In one embodiment of the present invention, a method for separating and purifying PP from an rP includes contacting said PP with propane at a pressure from about 200 psig (1.4 MPa) to about 8,000 psig (55.2 MPa). In another embodiment of the present invention, a method for separating and purifying PP from an rP includes contacting said PP with propane at a pressure from about 1,000 psig (6.9 MPa) to about 6,000 psig (41.4 MPa). In yet another embodiment of the present invention, a method for separating and purifying PP from an rP includes contacting said PP with propane at a pressure from about 2,000 psig (13.8 MPa) to about 4,000 psig (27.6 MPa).

In one embodiment of the present invention, said concentration of said extractable materials in said erP is less than about 90% of said concentration of said extractable materials in said rP. In another embodiment of the present invention, said concentration of said extractable materials in said erP is less than about 75% of said concentration of said extractable materials in said rP. In yet another embodiment of the present invention, said concentration of said extractable materials in said erP is less than about 50% of said concentration of said extractable materials in said rP. In even yet another embodiment of the present invention, said concentration of said extractable materials in said erP is about half said concentration of said extractable materials in said rP.

In one embodiment of the present invention, said concentration of said extractable materials in said erAHP is less than about 90% of said concentration of said extractable materials in said rAHP. In another embodiment of the present invention, said concentration of said extractable materials in said erAHP is less than about 75% of said concentration of said extractable materials in said rAHP. In yet another embodiment of the present invention, said concentration of said extractable materials in said erAHP is less than about 50% of said concentration of said extractable materials in said rAHP. In even yet another embodiment of the present invention, said concentration of said extractable materials in said erAHP is about half said concentration of said extractable materials in said rAHP.

In one embodiment of the present invention, said erP is essentially free of said extractable materials. In another embodiment of the present invention, said erAHP is essentially free of said extractable materials. In yet another embodiment of the present invention, said concentration of said extractable materials in said erP is further reduced during said purifying step. In even yet another embodiment of the present invention, said concentration of said extractable materials in said erAHP is further reduced during said purifying step.

In one embodiment of the present invention, a method for separating and purifying a PP polymer from an rAHP is provided, wherein said temperature range in said extracting step is from about 110° C. to about 170° C., and wherein said pressure range in said extracting step is from about 1,100 psig (7.6 MPa) to about 2,100 psig (14.5 MPa).

In one embodiment of the present invention, a method for separating and purifying polymers from an rP is provided, wherein said extraction solvent is propane, wherein said temperature in said extracting step is greater than about 100° C., and wherein said pressure in said extracting step is greater than about 150 psig (1 MPa) and lower than about 1,500 psig (10.3 MPa). In another embodiment of the present invention, a method for separating and purifying polymers from an rP is provided, wherein said extraction solvent is n-butane, wherein said temperature in said extracting step is greater than about 100° C., and wherein said pressure in said extracting step is greater than about 150 psig (1 MPa) and lower than about 900 psig (6.2 MPa). In yet another embodiment of the present invention, a method for separating and purifying polymers from an rP is provided, wherein said extraction solvent is pentane, wherein said temperature in said extracting step is greater than about 100° C., and wherein said pressure in said extracting step is greater than about 150 psig (1 MPa) and lower than about 500 psig (3.4 MPa). In even yet another embodiment of the present invention, a method for separating and purifying polymers from an rP is provided, wherein said extraction solvent is hexane, wherein said temperature in said extracting step is greater than about 100° C., and wherein said pressure in said extracting step is about 150 psig (1 MPa).

Dissolving Step

In one embodiment of the present invention, a method for separating and purifying polymers from a reclaimed product (rP) includes dissolving a first dissolvable base polymer of said rP by contacting said erP with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable polymer and domains of all remaining polymers in a first dissolvable base polymer solution; and wherein said first dissolvable base polymer has a solubilization range below the solubilization range of the remaining dissolvable base polymers. In another embodiment of the present invention, a method for separating and purifying polymers from a reclaimed absorbent hygiene product (rAHP) includes dissolving a first dissolvable base polymer of said rAHP by contacting said erAHP with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable polymer and domains of all remaining polymers in a first dissolvable base polymer solution; and wherein said first dissolvable base polymer has a solubilization range below the solubilization range of the remaining dissolvable base polymers. In yet another embodiment of the present invention, a method for separating and purifying polymers from a reclaimed film (rF) includes dissolving a first dissolvable base polymer of said rF by contacting said erF with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable polymer and domains of all remaining polymers in a first dissolvable base polymer solution; and wherein said first dissolvable base polymer has a solubilization range below the solubilization range of the remaining dissolvable base polymers. In even yet another embodiment of the present invention, a method for separating and purifying an ADH polymer from a reclaimed absorbent hygiene product (rAHP) includes dissolving said ADH base polymer of said rAHP by contacting said erAHP with a dissolving step solvent at a temperature range and a pressure range sufficient to cause said ADH base polymer to solubilize in said dissolving step solvent; whereby producing an initial suspension; wherein said initial suspension comprises a suspension of said particulate additives associated with said ADH polymer and domains of TPE, PP, PE, PET, cellulose, and PAA polymers in an ADH base polymer solution; and wherein said ADH base polymer has a solubilization range below the solubilization range of said TPE, PP, PE, and PET base polymers; and wherein said dissolving step domains comprise said TPE, PP, PE, PET, cellulose, and PAA polymers. In one embodiment of the present invention, a method for separating and purifying a PP polymer from a reclaimed absorbent hygiene product (rAHP) includes dissolving said PP base polymer of said rAHP by contacting said erAHP with a dissolving step solvent at a temperature range and a pressure range sufficient to cause said PP base polymer to solubilize in said dissolving step solvent; whereby producing an initial suspension; wherein said initial suspension comprises a suspension of said particulate additives associated with said PP polymer and domains of cellulose and PAA polymers in a PP base polymer solution.

Although not wishing to be bound by any theory, applicants believe that the temperature and pressure can be controlled in such a way to enable thermodynamically favorable dissolution of the polymers in a dissolving step solvent. Furthermore, the temperature and pressure can be controlled in such a way to enable dissolution of a particular polymer or polymer mixture while not dissolving other polymers or polymer mixtures. This controllable dissolution enables the separation of polymers from polymer mixtures or reclaimed products.

In one embodiment of the present invention, a method for separating and purifying polymers includes dissolving a reclaimed product containing these polymers in a dissolving step solvent that dissolves one of the polymers and does not dissolve the other polymers under the same conditions of temperature and pressure, which remain as domains in the suspension. The above process is then repeated for the other polymers.

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with a dissolving step solvent at a temperature and a pressure wherein said PP base polymer is dissolved in said dissolving step solvent. In another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a temperature from about 90° C. to about 220° C. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a temperature from about 100° C. to about 200° C. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a temperature from about 130° C. to about 180° C.

In one embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a pressure from about 350 psig (2.4 MPa) to about 20,000 psig (137.9 MPa). In another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a pressure from about 350 psig (2.4 MPa) to about 4,000 psig (27.6 MPa). In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a pressure from about 1,000 psig (6.9 MPa) to about 3,500 psig (24.1 MPa). In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a pressure from about 2,000 psig (13.8 MPa) to about 3,000 psig (20.7 MPa).

In one embodiment of the present invention, a method for separating and purifying a PP polymer from an rAHP is provided, wherein said temperature range in said dissolving step is from about 90° C. to about 220° C., and wherein said pressure range in said dissolving step is from about 350 psig (2.4 MPa) to about 20,000 psig (137.9 MPa).

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with n-butane at a weight concentration of at least about 0.5%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration of at least about 1%. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration of at least about 2%. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration of at least about 3%. In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with n-butane at a weight concentration of at least about 4%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration of at least about 5%.

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with a dissolving step solvent at a weight concentration up to about 20%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration up to about 18%. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration up to about 16%. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in n-butane at a weight concentration up to about 14%. In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with a dissolving step solvent at a weight concentration up to about 12%.

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with propane at a temperature and a pressure wherein said PP base polymer is dissolved in said dissolving step solvent. In another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a temperature from about 90° C. to about 220° C. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a temperature from about 100° C. to about 200° C. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a temperature from about 130° C. to about 180° C.

In one embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a pressure from about 2,000 psig (13.8 MPa) to about 8,000 psig (55.2 MPa). In another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a pressure from about 3,000 psig (20.7 MPa) to about 6,000 psig (41.4 MPa). In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a pressure from about 3,500 psig (24.1 MPa) to about 5,000 psig (34.5 MPa).

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with propane at a weight concentration of at least about 0.5%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration of at least about 1%. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration of at least about 2%. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration of at least about 3%. In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with propane at a weight concentration of at least about 4%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration of at least about 5%.

In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with propane at a weight concentration up to about 20%. In another embodiment of the present invention, said method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration up to about 18%. In yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration up to about 16%. In even yet another embodiment of the present invention, a method for separating and purifying a PP polymer from an rAHP, wherein said PP polymer comprises a PP base polymer, particulate additives associated with said PP polymer, and extractable materials associated with said PP polymer, includes dissolving said PP base polymer in propane at a weight concentration up to about 14%. In one embodiment of the present invention, a method for separating and purifying a PP polymer from a reclaimed absorbent hygiene product (rAHP), wherein said PP polymer comprises a PP base polymer, particulate additives associated with said PP polymer, and extractable materials associated with said PP polymer, includes dissolving said PP base polymer of said rAHP by contacting said rAHP with propane at a weight concentration up to about 12%.

In one embodiment of the present invention, said dissolving step solvent is selected from the group consisting of olefinic hydrocarbons, aliphatic hydrocarbons, and mixtures thereof. In another embodiment of the present invention, said extraction solvent is the same as said dissolving step solvent.

In one embodiment of the present invention, said dissolving step is in batch mode. In another embodiment of the present invention, said dissolving step is in continuous mode.

The dissolving step produces an initial suspension. The initial suspension comprises a suspension of particulate additives associated with a dissolvable polymer in a dissolvable base polymer solution and domains of all remaining polymers.

In one embodiment of the present invention, said domains of all remaining polymers comprise cellulose and PAA polymers. In another embodiment of the present invention, said domains of all remaining polymers are separated into said PAA polymer and said cellulose polymer. One of the purposes for separating the PAA polymer and the cellulose polymer is to reuse them in future AHP. In one embodiment of the present invention, said PAA polymer separated from said dissolving step domains comprises water at a level exceeding 30 g water/g PAA polymer. In another embodiment of the present invention, said PAA polymer is further dehydrated to less than 1 g water/g PAA polymer via a dehydration process. Non-limiting examples of dehydration processes are contacting the PAA polymer with a salt solution, an acidic solution, a basic solution, and a solvent that forms an azeotrope with water; pressurization; and centrifugation. In yet another embodiment of the present invention, said dehydration process is selected from the group consisting of contacting said PAA polymer with a salt solution, an acidic solution, a basic solution, and a solvent that forms an azeotrope with water; pressurization; centrifugation; and mixtures thereof. Non-limiting examples of solvents that form an azeotrope with water are methanol, ethanol, n-propanol, isopropyl alcohol, n-butanol, isobutanol, and 2-butanol. In even yet another embodiment of the present invention, said solvent is an alcohol selected from the group consisting of methanol, ethanol, n-propanol, isopropyl alcohol, n-butanol, isobutanol, 2-butanol, and mixtures thereof.

In one embodiment of the present invention, said dehydrated PAA polymer is used to produce a new AHP. In another embodiment of the present invention, said PAA polymer is subjected to de-polymerization to produce monomeric acrylic acid (AA) or oligomeric acrylic acid (OAA). In yet another embodiment of the present invention, said AA or OAA is further polymerized to virgin PAA polymer and used to produce a new AHP. Non-limiting examples of de-polymerization of PAA polymers are de-polymerization in the presence of dissolved $CO_2$, de-polymerization using ultrasonics and solar irradiation, thermal degradation, and mechano-chemistry (e.g. applying mechanical forces to achieve de-polymerization).

In one embodiment of the present invention, a method for separating and purifying an ADH polymer from an rP is provided, wherein said dissolving step solvent is propane, wherein said temperature range in said dissolving step starts at about 100° C., and wherein said pressure range in said dissolving step starts at about 1,500 psig (10.3 MPa). In another embodiment of the present invention, a method for separating and purifying an ADH polymer from an rP is provided, wherein said dissolving step solvent is n-butane, wherein said temperature range in said dissolving step starts at about 100° C., and wherein said pressure range in said dissolving step starts at about 900 psig (6.2 MPa). In yet another embodiment of the present invention, a method for separating and purifying an ADH polymer from an rP is provided, wherein said dissolving step solvent is pentane, wherein said temperature range in said dissolving step starts at about 100° C., and wherein said pressure range in said dissolving step starts at about 500 psig (3.4 MPa). In even yet another embodiment of the present invention, a method for separating and purifying an ADH polymer from an rP is provided, wherein said dissolving step solvent is hexane, wherein said temperature range in said dissolving step starts at about 100° C., and wherein said pressure range in said dissolving step starts at about 150 psig (1 MPa).

In one embodiment of the present invention, a method for separating and purifying a TPE polymer from an rP is provided, wherein said dissolving step solvent is propane, wherein said temperature range in said dissolving step starts at about 100° C., and wherein said pressure range in said dissolving step starts at about 3,000 psig (20.7 MPa). In another embodiment of the present invention, a method for separating and purifying a TPE polymer from an rP is provided, wherein said dissolving step solvent is n-butane, wherein said temperature range in said dissolving step starts at about 100° C., and wherein said pressure range in said dissolving step starts at about 1,200 psig (8.3 MPa). In yet another embodiment of the present invention, a method for separating and purifying a TPE polymer from an rP is provided, wherein said dissolving step solvent is pentane, wherein said temperature range in said dissolving step starts at about 100° C., and wherein said pressure range in said dissolving step starts at about 700 psig (4.8 MPa). In even yet another embodiment of the present invention, a method for separating and purifying a TPE polymer from an rP is provided, wherein said dissolving step solvent is hexane, wherein said temperature range in said dissolving step starts at about 100° C., and wherein said pressure range in said dissolving step starts at about 200 psig (1.4 MPa).

In one embodiment of the present invention, a method for separating and purifying a PP polymer from an rP is provided, wherein said dissolving step solvent is propane, wherein said temperature range in said dissolving step starts at about 100° C., and wherein said pressure range in said dissolving step starts at about 7,000 psig (48.3 MPa). In another embodiment of the present invention, a method for separating and purifying a PP polymer from an rP is provided, wherein said dissolving step solvent is n-butane, wherein said temperature range in said dissolving step starts at about 100° C., and wherein said pressure range in said dissolving step starts at about 1,800 psig (12.4 MPa). In yet another embodiment of the present invention, a method for separating and purifying a PP polymer from an rP is provided, wherein said dissolving step solvent is pentane, wherein said temperature range in said dissolving step starts at about 100° C., and wherein said pressure range in said dissolving step starts at about 1,400 psig (9.7 MPa). In even yet another embodiment of the present invention, a method for separating and purifying a PP polymer from an rP is provided, wherein said dissolving step solvent is hexane, wherein said temperature range in said dissolving step starts at about 100° C., and wherein said pressure range in said dissolving step starts at about 350 psig (2.4 MPa).

In one embodiment of the present invention, a method for separating and purifying a PE polymer from an rP is provided, wherein said dissolving step solvent is propane, wherein said temperature range in said dissolving step starts at about 100° C., and wherein said pressure range in said dissolving step starts at about 10,000 psig (68.9 MPa). In another embodiment of the present invention, a method for separating and purifying a PE polymer from an rP is provided, wherein said dissolving step solvent is n-butane, wherein said temperature range in said dissolving step starts at about 100° C., and wherein said pressure range in said dissolving step starts at about 4,500 psig (31 MPa). In yet another embodiment of the present invention, a method for separating and purifying a PE polymer from an rP is provided, wherein said dissolving step solvent is pentane, wherein said temperature range in said dissolving step starts at about 100° C., and wherein said pressure range in said dissolving step starts at about 2,900 psig (20 MPa). In even yet another embodiment of the present invention, a method for separating and purifying a TPE polymer from an rP is provided, wherein said dissolving step solvent is hexane, wherein said temperature range in said dissolving step starts at about 100° C., and wherein said pressure range in said dissolving step starts at about 1,000 psig (6.9 MPa).

In one embodiment of the present invention, a method for separating and purifying a PET polymer from an rP is provided, wherein said dissolving step solvent is propane, wherein said temperature range in said dissolving step starts at about 100° C., and wherein said pressure range in said dissolving step starts at about 34,000 psig (234.4 MPa). In another embodiment of the present invention, a method for separating and purifying a PET polymer from an rP is provided, wherein said dissolving step solvent is n-butane, wherein said temperature range in said dissolving step starts at about 100° C., and wherein said pressure range in said dissolving step starts at about 15,000 psig (103.4 MPa). In yet another embodiment of the present invention, a method for separating and purifying a PET polymer from an rP is provided, wherein said dissolving step solvent is pentane, wherein said temperature range in said dissolving step starts at about 100° C., and wherein said pressure range in said dissolving step starts at about 10,000 psig (68.9 MPa). In even yet another embodiment of the present invention, a method for separating and purifying a PET polymer from an rP is provided, wherein said dissolving step solvent is hexane, wherein said temperature range in said dissolving step starts at about 100° C., and wherein said pressure range in said dissolving step starts at about 3,500 psig (24.1 MPa).

Settling Step

In one embodiment of the present invention, a method for separating and purifying polymers from a reclaimed product (rP) includes settling said initial suspension at a temperature range and a pressure range sufficient to produce a collection of settled particulate additives and said domains of all remaining polymers, and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution. In another embodiment of the present invention, a method for separating and purifying polymers from a reclaimed absorbent hygiene product (rAHP) includes settling said initial suspension at a temperature range and a pressure range sufficient to produce a collection of settled particulate additives and said domains of all remaining polymers, and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution. In yet another embodiment of the present invention, a method for separating and purifying polymers from a reclaimed film (rF) includes settling said initial suspension at a temperature range and a pressure range sufficient to produce a collection of settled particulate additives and said domains of all remaining polymers, and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution. In even yet another embodiment of the present invention, a method for separating and purifying an ADH polymer from a reclaimed absorbent hygiene product (rAHP) includes settling said initial suspension at a temperature range and a pressure range sufficient to produce a collection of settled particulate additives and said domains of TPE, PP, PE, PET, cellulose, and PAA polymers, and an intermediate suspension; wherein said collection of settled particulate additives comprises particulate additives associated with said ADH polymer; and wherein said intermediate suspension comprises a suspension of non-settled particulate additives associated with said ADH polymer in said ADH base polymer solution. In one embodiment of the present invention, a method for separating and purifying a PP polymer from a reclaimed absorbent hygiene product (rAHP) includes settling said initial suspension at a temperature range and a pressure range sufficient to produce a collection of settled particulate additives and said domains of cellulose and PAA polymers, and an intermediate suspension; wherein said collection of settled particulate additives comprises particulate additives associated with said PP polymer; and wherein said intermediate suspension comprises a suspension of non-settled particulate additives associated with said PP polymer in said PP base polymer solution.

The settling step causes the undissolved particulate additives associated with the polymers, and the particulate matter associated with the contaminants to experience a force that uniformly moves the particulate additives and matter in the direction of the force. Typically the applied settling force is gravity, but can also be a centrifugal, centripetal, or some other force. The amount of applied force and duration of settling time will depend upon several parameters, including, but not limited to: particle size and particle density of the particulate additives and particulate matter, and density and viscosity of the base polymer solution (i.e., solution of the base polymer dissolved in the dissolving step solvent). The following Equation 2 is a relationship between the aforementioned parameters and the settling velocity, which is a measure of the settling rate:

$$v=(\rho_p-\rho_f)gd^2/18\eta \qquad \text{Equation 2}$$

where v is the settling velocity, $\rho_p$ is the density of the particulate additives and matter, $\rho_f$ is the density of the base polymer solution, g is the acceleration due to the applied force (typically gravity), d is the diameter of the particles in the particulate additives and matter, and $\eta$ is the dynamic viscosity of the base polymer solution. Some of the key parameters that determine the solution viscosity are: chemical composition of the base polymer solution, molecular weight and concentration of the base polymer dissolved in the base polymer solution, and temperature and pressure of the base polymer solution.

In one embodiment of the present invention, a method for separating and purifying a PP polymer from an rAHP includes n-butane as the dissolving step solvent, and the temperature range in the settling step is from about 90° C. to about 220° C. In another embodiment of the present invention, a method for separating and purifying a PP polymer from an rAHP includes n-butane as the dissolving step solvent, and the temperature range in the settling step is from about 100° C. to about 200° C. In yet another embodiment of the present invention, a method for separating and purifying a PP polymer from an rAHP includes n-butane as the dissolving step solvent, and the temperature range in the settling step is from about 130° C. to about 180° C.

In one embodiment of the present invention, a method for separating and purifying a PP polymer from an rAHP includes n-butane as the dissolving step solvent, and the pressure range in the settling step is from about 350 psig (2.4 MPa) to about 4,000 psig (27.6 MPa). In another embodiment of the present invention, a method for separating and purifying a PP polymer from an rAHP includes n-butane as the dissolving step solvent, and the pressure range in the settling step is from about 1,000 psig (6.9 MPa) to about 3,500 psig (24.1 MPa). In yet another embodiment of the present invention, a method for separating and purifying a PP polymer from an rAHP includes n-butane as the dissolving step solvent, and the pressure range in the settling step is from about 2,000 psig (13.8 MPa) to about 3,000 psig (20.7 MPa).

In even yet another embodiment of the present invention, a method for separating and purifying a PP polymer from an rAHP is provided, wherein said temperature range in said settling step is from about 90° C. to about 220° C., and wherein said pressure range in said settling step is from about 350 psig (2.4 MPa) to about 20,000 psig (137.9 MPa).

In one embodiment of the present invention, a method for separating and purifying a PP polymer from an rAHP includes n-butane as the dissolving step solvent, and a weight concentration of said PP base polymer in said PP base polymer solution in said settling step of at least about 0.5%. In another embodiment of the present invention, a method for separating and purifying a PP polymer from an rAHP includes n-butane as the dissolving step solvent, and a weight concentration of said PP base polymer in said PP base polymer solution in said settling step of at least about 1%. In yet another embodiment of the present invention, a method for separating and purifying a PP polymer from an rAHP includes n-butane as the dissolving step solvent, and a weight concentration of said PP base polymer in said PP base polymer solution in said settling step of at least about 2%. In even yet another embodiment of the present invention, a method for separating and purifying a PP polymer from an rAHP includes n-butane as the dissolving step solvent, and a weight concentration of said PP base polymer in said PP base polymer solution in said settling step of at least about 3%. In one embodiment of the present invention, a method for separating and purifying a PP polymer from an rAHP includes n-butane as the dissolving step solvent, and a weight concentration of said PP base polymer in said PP base polymer solution in said settling step of at least about 4%. In another embodiment of the present invention, a method for separating and purifying a PP polymer from an rAHP includes n-butane as the dissolving step solvent, and a weight concentration of said PP base polymer in said PP base polymer solution in said settling step of at least about 5%.

In one embodiment of the present invention, a method for separating and purifying a PP polymer from an rAHP includes n-butane as the dissolving step solvent, and a weight concentration of said PP base polymer in said PP base polymer solution in said settling step up to about 20%. In another embodiment of the present invention, a method for separating and purifying a PP polymer from an rAHP includes n-butane as the dissolving step solvent, and a weight concentration of said PP base polymer in said PP base polymer solution in said settling step up to about 18%. In yet another embodiment of the present invention, a method for separating and purifying a PP polymer from an rAHP includes n-butane as the dissolving step solvent, and a weight concentration of said PP base polymer in said PP base polymer solution in said settling step up to about 16%. In even yet another embodiment of the present invention, a method for separating and purifying a PP polymer from an rAHP includes n-butane as the dissolving step solvent, and a weight concentration of said PP base polymer in said PP base polymer solution in said settling step up to about 14%. In one embodiment of the present invention, a method for separating and purifying a PP polymer from an rAHP includes n-butane as the dissolving step solvent, and a weight concentration of said PP base polymer in said PP base polymer solution in said settling step up to about 12%.

In one embodiment of the present invention, a method for separating and purifying a PP polymer from an rAHP includes propane as the dissolving step solvent, and the temperature range in the settling step is from about 90° C. to about 220° C. In another embodiment of the present invention, a method for separating and purifying a PP polymer from an rAHP includes propane as the dissolving step solvent, and the temperature range in the settling step is from about 100° C. to about 200° C. In yet another embodiment of the present invention, a method for separating and purifying a PP polymer from an rAHP includes propane as the dissolving step solvent, and the temperature range in the settling step is from about 130° C. to about 180° C.

In one embodiment of the present invention, a method for separating and purifying a PP polymer from an rAHP includes propane as the dissolving step solvent, and the pressure range in the settling step is from about 2,000 psig (13.8 MPa) to about 8,000 psig (55.2 MPa). In another embodiment of the present invention, a method for separating and purifying a PP polymer from an rAHP includes propane as the dissolving step solvent, and the pressure range in the settling step is from about 3,000 psig (20.7 MPa) to about 6,000 psig (41.4 MPa). In yet another embodiment of the present invention, a method for separating and purifying a PP polymer from an rAHP includes propane as the dissolving step solvent, and the pressure range in the settling step is from about 3,500 psig (24.1 MPa) to about 5,000 psig (34.5 MPa).

In one embodiment of the present invention, a method for separating and purifying a PP polymer from an rAHP includes propane as the dissolving step solvent, and a weight concentration of said PP base polymer in said PP base polymer solution in said settling step of at least about 0.5%. In another embodiment of the present invention, a method for separating and purifying a PP polymer from an rAHP includes propane as the dissolving step solvent, and a weight concentration of said PP base polymer in said PP base polymer solution in said settling step of at least about 1%. In yet another embodiment of the present invention, a method for separating and purifying a PP polymer from an rAHP includes propane as the dissolving step solvent, and a weight concentration of said PP base polymer in said PP base polymer solution in said settling step of at least about 2%. In even yet another embodiment of the present invention, a method for separating and purifying a PP polymer from an rAHP includes propane as the dissolving step solvent, and a weight concentration of said PP base polymer in said PP base polymer solution in said settling step of at least about 3%. In one embodiment of the present invention, a method for separating and purifying a PP polymer from an rAHP includes propane as the dissolving step solvent, and a weight concentration of said PP base polymer in said PP base polymer solution in said settling step of at least about 4%. In another embodiment of the present invention, a method for separating and purifying a PP polymer from an rAHP includes propane as the dissolving step solvent, and a weight concentration of said PP base polymer in said PP base polymer solution in said settling step of at least about 5%.

In one embodiment of the present invention, a method for separating and purifying a PP polymer from an rAHP includes propane as the dissolving step solvent, and a weight concentration of said PP base polymer in said PP base polymer solution in said settling step up to about 20%. In another embodiment of the present invention, a method for separating and purifying a PP polymer from an rAHP includes propane as the dissolving step solvent, and a weight concentration of said PP base polymer in said PP base polymer solution in said settling step up to about 18%. In yet another embodiment of the present invention, a method for separating and purifying a PP polymer from an rAHP includes propane as the dissolving step solvent, and a weight concentration of said PP base polymer in said PP base polymer solution in said settling step up to about 16%. In even yet another embodiment of the present invention, a method for separating and purifying a PP polymer from an rAHP includes propane as the dissolving step solvent, and a weight concentration of said PP base polymer in said PP base polymer solution in said settling step up to about 14%. In one embodiment of the present invention, a method for separating and purifying a PP polymer from an rAHP includes propane as the dissolving step solvent, and a weight concentration of said PP base polymer in said PP base polymer solution in said settling step up to about 12%.

In one embodiment of the present invention, said settling step is in batch mode.

The settling step produces a collection of settled particulate additives and the domains of all remaining polymers, and an intermediate suspension, and it lasts for a settling time. The collection of settled particulate additives comprises particulate additives associated with a dissolvable polymer, and the intermediate suspension comprises a suspension of non-settled particulate additives associated with a dissolvable polymer in the dissolvable base polymer solution. In one embodiment of the present invention, said collection of settled particulate additives comprises particulate additives associated with a dissolvable polymer and particulate matter associate with said contaminants. In another embodiment of the present invention, said intermediate suspension comprises a suspension of non-settled particulate additives associated with a dissolvable polymer in the dissolvable base polymer solution, and non-settled particulate matter associated with said contaminants.

In one embodiment of the present invention, said collection of settled particulate additives comprises particles with diameter larger than about 1 mm. In another embodiment of the present invention, said collection of settled particulate additives comprises particles with diameter larger than about 0.75 mm. In yet another embodiment of the present invention, said collection of settled particulate additives comprises particles with diameter larger than about 0.5 mm. In even yet another embodiment of the present invention, said collection of settled particulate additives comprises particles with diameter larger than about 300 µm. In one embodiment of the present invention, said collection of settled particulate additives comprises particles with diameter larger than about 100 µm. In another embodiment of the present invention, said collection of settled particulate additives comprises particles with diameter larger than about 50 µm. In yet another embodiment of the present invention, said collection of settled particulate additives comprises particles with diameter larger than about 20 µm.

In one embodiment of the present invention, said settling time is longer than about 24 h. In another embodiment of the present invention, said settling time is longer than about 12 h. In yet another embodiment of the present invention, said settling time is longer than about 6 h. In even yet another embodiment of the present invention, said settling time is longer than about 3 h. In one embodiment of the present invention, said settling time is longer than about 1 h. In yet another embodiment of the present invention, said settling time is longer than about 0.5 h.

In one embodiment of the present invention, said settling time is between about 24 h and 0.1 h. In another embodiment of the present invention, said settling time is between about 18 h and about 0.25 h. In yet another embodiment of the present invention, said settling time is between about 12 h and about 0.5 h. In even yet another embodiment of the present invention, said settling time is between about 12 h and about 1 h. In one embodiment of the present invention, said settling time is between about 6 h and about 2 h. In yet another embodiment of the present invention, said settling time is about 4 h.

In one embodiment of the present invention, said density of the particulate additives and particulate matter is higher than about 9 g/mL. In another embodiment of the present invention, said density of the particulate additives and particulate matter is from about 1 g/mL to about 9 g/mL. In yet another embodiment of the present invention, said density of the particulate additives and particulate matter is from about 1 g/mL to about 4 g/mL. In even yet another embodiment of the present invention, said density of the particulate additives and particulate matter is from about 2 g/mL to about 3.5 g/mL.

In one embodiment of the present invention, said density of the base polymer solution is higher than about 0.8 g/mL. In another embodiment of the present invention, said density of the base polymer solution is from about 0.8 g/mL to about 3 g/mL. In yet another embodiment of the present invention, said density of the base polymer solution is from about 0.9 g/mL to about 2 g/mL. In even yet another embodiment of the present invention, said density of the base polymer solution is from about 1 g/mL to about 1.5 g/mL.

In one embodiment of the present invention, said dynamic viscosity of the base polymer solution is higher than about 0.5 mPa·s. In another embodiment of the present invention, said dynamic viscosity of the base polymer solution is from about 0.6 mPa·s to about 100 mPa·s. In yet another embodiment of the present invention, said dynamic viscosity of the base polymer solution is from about 1 mPa·s to about 20 mPa·s. In even yet another embodiment of the present invention, said dynamic viscosity of the base polymer solution is from about 2 mPa·s to about 10 mPa·s.

Purifying Step

In one embodiment of the present invention, a method for separating and purifying polymers from a reclaimed product (rP) includes purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution. In another embodiment of the present invention, a method for separating and purifying polymers from a reclaimed absorbent hygiene product (rAHP) includes purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution. In yet another embodiment of the present invention, a method for separating and purifying polymers from a reclaimed film (rF) includes purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution. In even yet another embodiment of the present invention, a method for separating and purifying an ADH polymer from a reclaimed absorbent hygiene product (rAHP) includes purifying said intermediate suspension with a solid medium at a temperature range and a pressure range sufficient to produce a final suspension; wherein a fraction of said particulate additives associated with said ADH polymer is retained by said solid medium; and wherein said final suspension comprises a suspension of non-retained particulate additives associated with said ADH polymer in said ADH base polymer solution. In one embodiment of the present invention, a method for separating and purifying a PP polymer from a reclaimed absorbent hygiene product (rAHP) includes purifying said intermediate suspension with a solid medium at a temperature range and a pressure range sufficient to produce a final suspension; wherein a fraction of said particulate additives associated with said PP polymer is retained by said solid medium; and wherein said final suspension comprises a suspension of non-retained particulate additives associated with said PP polymer in said PP base polymer solution.

The solid medium of the present invention is any solid material that retains a fraction of said particulate additives from the final suspension. Said solid medium can also retain a fraction of said particulate matter associated with said contaminants, and a fraction of said extractable materials in said rP that has not been removed in said extracting step.

Although not wishing to be bound by any theory, applicants believe that the solid medium removes said particulate additives and particulate matter by a variety of mechanisms. Non-limiting examples of possible mechanisms include adsorption, absorption, size exclusion, ion exclusion, ion exchange, and other mechanisms that may be apparent to those having ordinary skill in the art. Furthermore, the pigments and other materials commonly found in reclaimed products may be polar compounds and may preferentially interact with the solid medium, which may also be at least slightly polar. The polar-polar interactions are especially favorable when non-polar solvents, such as alkanes, are used as the dissolving step solvent.

In one embodiment of the present invention, the solid medium is selected from the group consisting of inorganic substances, carbon-based substances, and mixtures thereof. Non-limiting examples of inorganic substances are silicon oxide (silica), silica gel, aluminum oxide (alumina), iron oxide, aluminum silicate, magnesium silicate, amorphous volcanic glass, reclaimed glass, sand, quartz, diatomaceous earth, zeolite, perlite, clay, fuller's earth, bentonite clay, metal organic framework (MOF), covalent organic framework (COF), and zeolitic imidazolate framework (ZIF). Non-limiting examples of carbon-based substances are anthracite coal, carbon black, coke, and activated carbon. In one embodiment of the present invention, said inorganic substances are selected from the group consisting of silicon oxide (silica), silica gel, aluminum oxide (alumina), iron oxide, aluminum silicate, magnesium silicate, amorphous volcanic glass, reclaimed glass, sand, quartz, diatomaceous earth, zeolite, perlite, clay, fuller's earth, bentonite clay, metal organic framework (MOF), covalent organic framework (COF), zeolitic imidazolate framework (ZIF), and mixtures thereof. In another embodiment of the present invention, said inorganic substances are selected from the group consisting of silicon oxide (silica), silica gel, aluminum oxide (alumina), amorphous volcanic glass, reclaimed glass, sand, quartz, diatomaceous earth, zeolite, clay, fuller's earth, bentonite clay, and mixtures thereof. In yet another embodiment of the present invention, said carbon-based substances are selected from the group consisting of anthracite coal, carbon black, coke, activated carbon, and mixtures thereof. In even yet another embodiment of the present invention, the solid medium is recycled glass.

In one embodiment of the present invention, the solid medium is contacted with said intermediate suspension in a vessel for a specified amount of time while the solid medium is agitated. In another embodiment of the present invention, the solid medium is removed from said final suspension via a solid-liquid separation step. Non-limiting examples of solid-liquid separation steps include filtration, decantation, centrifugation, and settling. In yet another embodiment of the present invention, said intermediate suspension is passed through a stationary bed of solid medium. In even yet another embodiment of the present invention, said solid medium is arranged in a fixed bed configuration. This fixed bed configuration includes an axial filter, a radial filter, or a combination of both. In one embodiment of the present invention, said fixed bed configuration comprises at least 2 fixed beds in series. In another embodiment of the present invention, the height or length of the fixed bed of said solid medium is greater than about 5 cm. In yet another embodiment of the present invention, the height or length of the fixed bed of said solid medium is greater than about 10 cm. In even yet another embodiment of the present invention, the height or length of the fixed bed of said solid medium is greater than about 20 cm. In one embodiment of the present invention, the diameter of the fixed bed of said solid medium is greater than about 1 cm. In another embodiment of the present invention, the diameter of the fixed bed of said solid medium is greater than about 2 cm. In yet another embodiment of the present invention, the diameter of the fixed bed of said solid medium is greater than about 5 cm. In one embodiment of the present invention, the length to diameter ratio of said fixed bed of said solid medium is greater than about 1. In another embodiment of the present invention, the length to diameter ratio of said fixed bed of said solid medium is greater than about 5. In yet another embodiment of the present invention, the length to diameter ratio of said fixed bed of said solid medium is greater than about 10. In even yet another embodiment of the present invention, the length to diameter ratio of said fixed bed of said solid medium is greater than about 20.

As used herein, the term "median solid medium particle size" refers to the diameter of a solid medium particle below or above which 50% of the total volume of particles lie, and is designated as $D_{v,0.50}$. Further, the term "solid medium particle span" is a statistical representation of a given solid medium particle sample and can be calculated as follows. First, the median size is calculated as described above. Then, by a similar method, the solid medium particle size that separates the particle sample at the 10% by volume fraction, $D_{v,0.10}$, is determined, and then the solid medium particle size that separates the particle sample at the 90% by volume fraction, $D_{v,0.90}$, is determined. The solid medium particle span is then equal to: $(D_{v,0.90}-D_{v,0.10})/D_{v,0.50}$. In one embodiment of the present invention, said solid medium particle span is less than about 2. In another embodiment of the present invention, said solid medium particle span is less than about 1.5. In yet another embodiment of the present invention, said solid medium particle span is less than about 1.5. In even yet another embodiment of the present invention, said solid medium particle span is less than about 1.3. In one embodiment of the present invention, said solid medium particle span is between about 1.1 and about 2. In another embodiment of the present invention, said solid medium particle span is between about 1.3 and about 1.5.

In one embodiment of the present invention, the solid medium is replaced, as needed, to maintain a desired composition of said final suspension. In another embodiment of the present invention, the solid medium is regenerated and re-used in the purifying step. In yet another embodiment of the present invention, the solid medium is regenerated by fluidizing the solid medium during a backwashing step.

In one embodiment of the present invention, said purifying step is in continuous mode. In another embodiment of the present invention, said purifying step is in batch mode.

In one embodiment of the present invention, a method for separating and purifying a PP polymer from an rAHP includes n-butane as the dissolving step solvent, and the temperature range in the purifying step is from about 90° C. to about 220° C. In another embodiment of the present invention, a method for separating and purifying a PP polymer from an rAHP includes n-butane as the dissolving step solvent, and the temperature range in the purifying step is from about 100° C. to about 200° C. In yet another embodiment of the present invention, a method for separating and purifying a PP polymer from an rAHP includes n-butane as the dissolving step solvent, and the temperature range in the purifying step is from about 130° C. to about 180° C.

In one embodiment of the present invention, a method for separating and purifying a PP polymer from an rAHP includes n-butane as the dissolving step solvent, and the pressure range in the purifying step is from about 350 psig (2.4 MPa) to about 4,000 (27.6 MPa). In another embodiment of the present invention, a method for separating and purifying a PP polymer from an rAHP includes n-butane as the dissolving step solvent, and the pressure range in the purifying step is from about 1,000 psig (6.9 MPa) to about 3,500 (24.1 MPa). In yet another embodiment of the present invention, a method for separating and purifying a PP polymer from an rAHP includes n-butane as the dissolving step solvent, and the pressure range in the purifying step is from about 2,000 psig (13.8 MPa) to about 3,000 (20.7 MPa).

In one embodiment of the present invention, a method for separating and purifying a PP polymer from an rAHP is provided, wherein said temperature range in said purifying step is from about 90° C. to about 220° C., and wherein said pressure range in said purifying step is from about 350 psig (2.4 MPa) to about 20,000 psig (137.9 MPa).

In one embodiment of the present invention, a method for separating and purifying a PP polymer from an rAHP includes n-butane as the dissolving step solvent, and a weight concentration of said PP base polymer in said PP base polymer solution in said intermediate suspension of at least about 0.5%. In another embodiment of the present invention, a method for separating and purifying a PP polymer from an rAHP includes n-butane as the dissolving step solvent, and a weight concentration of said PP base polymer in said PP base polymer solution in said intermediate suspension of at least about 1%. In yet another embodiment of the present invention, a method for separating and purifying a PP polymer from an rAHP includes n-butane as the dissolving step solvent, and a weight concentration of said PP base polymer in said PP base polymer solution in said intermediate suspension of at least about 2%. In even yet another embodiment of the present invention, a method for separating and purifying a PP polymer from an rAHP includes n-butane as the dissolving step solvent, and a weight concentration of said PP base polymer in said PP base polymer solution in said intermediate suspension of at least about 3%. In one embodiment of the present invention, a method for separating and purifying a PP polymer from an rAHP includes n-butane as the dissolving step solvent, and a weight concentration of said PP base polymer in said PP base polymer solution in said intermediate suspension of at least about 4%. In another embodiment of the present invention, a method for separating and purifying a PP polymer from an rAHP includes n-butane as the dissolving step solvent, and a weight concentration of said PP base polymer in said PP base polymer solution in said intermediate suspension of at least about 5%.

In one embodiment of the present invention, a method for separating and purifying a PP polymer from an rAHP includes n-butane as the dissolving step solvent, and a weight concentration of said PP base polymer in said PP base polymer solution in said intermediate suspension up to about 20%. In another embodiment of the present invention, a method for separating and purifying a PP polymer from an rAHP includes n-butane as the dissolving step solvent, and a weight concentration of said PP base polymer in said PP base polymer solution in said intermediate suspension up to about 18%. In yet another embodiment of the present invention, a method for separating and purifying a PP polymer from an rAHP includes n-butane as the dissolving step solvent, and a weight concentration of said PP base polymer in said PP base polymer solution in said intermediate suspension up to about 16%. In even yet another embodiment of the present invention, a method for separating and purifying a PP polymer from an rAHP includes n-butane as the dissolving step solvent, and a weight concentration of said PP base polymer in said PP base polymer solution in said intermediate suspension up to about 14%. In one embodiment of the present invention, a method for separating and purifying a PP polymer from an rAHP includes n-butane as the dissolving step solvent, and a weight concentration of said PP base polymer in said PP base polymer solution in said intermediate suspension up to about 12%.

In one embodiment of the present invention, a method for separating and purifying a PP polymer from an rAHP includes propane as the dissolving step solvent, and the temperature range in the purifying step is from about 90° C. to about 220° C. In another embodiment of the present invention, a method for separating and purifying a PP polymer from an rAHP includes propane as the dissolving step solvent, and the temperature range in the purifying step is from about 100° C. to about 200° C. In yet another embodiment of the present invention, a method for separating and purifying a PP polymer from an rAHP includes propane as the dissolving step solvent, and the temperature range in the purifying step is from about 130° C. to about 180° C.

In one embodiment of the present invention, a method for separating and purifying a PP polymer from an rAHP includes propane as the dissolving step solvent, and the pressure range in the purifying step is from about 2,000 psig (13.8 MPa) to about 8,000 (55.2 MPa). In another embodiment of the present invention, a method for separating and purifying a PP polymer from an rAHP includes propane as the dissolving step solvent, and the pressure range in the purifying step is from about 3,000 psig (20.7 MPa) to about 6,000 (41.4 MPa). In yet another embodiment of the present invention, a method for separating and purifying a PP polymer from an rAHP includes propane as the dissolving step solvent, and the pressure range in the purifying step is from about 3,500 psig (24.1 MPa) to about 5,000 (34.5 MPa).

In one embodiment of the present invention, a method for separating and purifying a PP polymer from an rAHP includes propane as the dissolving step solvent, and a weight concentration of said PP base polymer in said PP base polymer solution in said intermediate suspension of at least about 0.5%. In another embodiment of the present invention, a method for separating and purifying a PP polymer from an rAHP includes propane as the dissolving step solvent, and a weight concentration of said PP base polymer in said PP base polymer solution in said intermediate suspension of at least about 1%. In yet another embodiment of the present invention, a method for separating and purifying a PP polymer from an rAHP includes propane as the dissolving step solvent, and a weight concentration of said PP base polymer in said PP base polymer solution in said intermediate suspension of at least about 2%. In even yet another embodiment of the present invention, a method for separating and purifying a PP polymer from an rAHP includes propane as the dissolving step solvent, and a weight concentration of said PP base polymer in said PP base polymer solution in said intermediate suspension of at least about 3%. In one embodiment of the present invention, a method for separating and purifying a PP polymer from an rAHP includes propane as the dissolving step solvent, and a weight concentration of said PP base polymer in said PP base polymer solution in said intermediate suspension of at least about 4%. In another embodiment of the present invention, a method for separating and purifying a PP polymer from an rAHP includes propane as the dissolving step solvent, and a weight concentration of said PP base polymer in said PP base polymer solution in said intermediate suspension of at least about 5%.

In one embodiment of the present invention, a method for separating and purifying a PP polymer from an rAHP includes propane as the dissolving step solvent, and a weight concentration of said PP base polymer in said PP base polymer solution in said intermediate suspension up to about 20%. In another embodiment of the present invention, a method for separating and purifying a PP polymer from an rAHP includes propane as the dissolving step solvent, and a weight concentration of said PP base polymer in said PP base polymer solution in said intermediate suspension up to about 18%. In yet another embodiment of the present invention, a method for separating and purifying a PP polymer from an rAHP includes propane as the dissolving step solvent, and a weight concentration of said PP base polymer in said PP base polymer solution in said intermediate suspension up to about 16%. In even yet another embodiment of the present invention, a method for separating and purifying a PP polymer from an rAHP includes propane as the dissolving step solvent, and a weight concentration of said PP base polymer in said PP base polymer solution in said intermediate suspension up to about 14%. In one embodiment of the present invention, a method for separating and purifying a PP polymer from an rAHP includes propane as the dissolving step solvent, and a weight concentration of said PP base polymer in said PP base polymer solution in said intermediate suspension up to about 12%.

Separating Step

In one embodiment of the present invention, a method for separating and purifying polymers from a reclaimed product (rP) includes separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rP. In another embodiment of the present invention, a method for separating and purifying polymers from a reclaimed absorbent hygiene product (rAHP) includes separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rAHP. In yet another embodiment of the present invention, a method for separating and purifying polymers from a reclaimed film (rF) includes separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rF. In even yet another embodiment of the present invention, a method for separating and purifying an ADH polymer from a reclaimed absorbent hygiene product (rAHP) includes separating said dissolving step solvent from said final suspension at a temperature range and a pressure range sufficient to produce a separated and purified ADH polymer; and wherein said separated and purified ADH polymer comprises said ADH base polymer and said particulate additives associated with said ADH polymer dispersed in said separated and purified ADH polymer at a concentration lower than said concentration of said particulate additives associated with said ADH polymer in said ADH polymer in said rAHP. In one embodiment of the present invention, a method for separating and purifying a PP polymer from a reclaimed absorbent hygiene product (rAHP) includes separating said dissolving step solvent from said final suspension at a temperature range and a pressure range sufficient to produce a separated and purified PP polymer; and wherein said separated and purified PP polymer comprises said first PP base polymer and said particulate additives associated with said PP polymer dispersed in said separated and purified PP polymer at a concentration lower than said concentration of said particulate additives associated with said PP polymer in said PP polymer in said rAHP.

In one embodiment of the present invention, the separating step is at a temperature and at a pressure wherein the polymer precipitates from solution and is no longer dissolved in the dissolving step solvent. In another embodiment of the present invention, the separating step is accomplished by reducing the pressure at a fixed temperature. In yet another embodiment of the present invention, the separating step is accomplished by reducing the temperature at a fixed pressure. In even yet another embodiment of the present invention, the separating step is accomplished by increasing the temperature at a fixed pressure. In one embodiment of the present invention, the separating step is accomplished by reducing both the temperature and pressure. The dissolving step solvent can be partially or completely converted from the liquid to the vapor phase by controlling the temperature and pressure.

In another embodiment of the present invention, the precipitated polymer is separated from the dissolving step solvent without completely converting the dissolving step solvent into a 100% vapor phase by controlling the temperature and pressure of the dissolving step solvent during the separating step. The separating of the precipitated polymer is accomplished by any method of liquid-liquid or liquid-solid separation. Non-limiting examples of liquid-liquid or liquid-solid separations include filtration, decantation, centrifugation, and settling.

In one embodiment of the present invention, a method for separating and purifying a PP polymer from an rAHP includes n-butane as the dissolving step solvent and the temperature range in the separating step is from about 0° C. to about 220° C. In another embodiment of the present invention, a method for separating and purifying a PP polymer from an rAHP includes n-butane as the dissolving step solvent and the temperature range in the separating step is from about 100° C. to about 220° C. In yet another embodiment of the present invention, a method for separating and purifying a PP polymer from an rAHP includes n-butane as the dissolving step solvent and the temperature range in the separating step is from about 130° C. to about 180° C.

In one embodiment of the present invention, a method for separating and purifying a PP polymer from an rAHP includes n-butane as the dissolving step solvent and the pressure range in the separating step is from about 0 psig (0 MPa) to about 2,000 psig (13.8 MPa). In another embodiment of the present invention, a method for separating and purifying a PP polymer from an rAHP includes n-butane as the dissolving step solvent and the pressure range in the separating step is from about 50 (0.34 MPa) to about 1,500 psig (10.3 MPa). In yet another embodiment of the present invention, a method for separating and purifying a PP polymer from an rAHP includes n-butane as the dissolving step solvent and the pressure range in the separating step is from about 75 psig (0.52 MPa) to about 1,000 psig (6.9 MPa).

In one embodiment of the present invention, a method for separating and purifying a PP polymer from an rAHP includes propane as the dissolving step solvent and the temperature range in the separating step is from about −42° C. to about 220° C. In another embodiment of the present invention, a method for separating and purifying a PP polymer from an rAHP includes propane as the dissolving step solvent and the temperature range in the separating step is from about 0° C. to about 150° C. In yet another embodiment of the present invention, a method for separating and purifying a PP polymer from an rAHP includes propane as the dissolving step solvent and the temperature range in the separating step is from about 50° C. to about 130° C.

In one embodiment of the present invention, a method for separating and purifying a PP polymer from an rAHP includes propane as the dissolving step solvent and the pressure range in the separating step is from about 0 psig (0 MPa) to about 6,000 psig (41.4 MPa). In another embodiment of the present invention, a method for separating and purifying a PP polymer from an rAHP includes propane as the dissolving step solvent and the pressure range in the separating step is from about 50 (0.34 MPa) to about 3,000 psig (20.7 MPa). In yet another embodiment of the present invention, a method for separating and purifying a PP polymer from an rAHP includes propane as the dissolving step solvent and the pressure range in the separating step is from about 75 psig (0.52 MPa) to about 1,000 psig (6.9 MPa).

In one embodiment of the present invention, a method for separating and purifying a PP polymer from an rAHP is provided, wherein said temperature range in said separating step is from about 0° C. to about 220° C., and wherein said pressure range is from about 0 psig (0 MPa) to about 2,000 psig (13.8 MPa).

In one embodiment of the present invention, the separated and purified polymer that is produced from the separating step comprises the base polymer and the particulate additives associated with the polymer dispersed in the separated and purified polymer at a concentration lower than the concentration of the particulate additives associated with the polymer dispersed in the base polymer in the rP. In another embodiment of the present invention, the separated and purified polymer that is produced from the separating step comprises the base polymer and the particulate additives associated with the polymer dispersed in the separated and purified polymer at a concentration lower than the concentration of the particulate additives associated with the polymer dispersed in the base polymer in the rAHP. In yet another embodiment of the present invention, the separated and purified polymer that is produced from the separating step comprises the base polymer and the particulate additives associated with the polymer dispersed in the separated and purified polymer at a concentration lower than the concentration of the particulate additives associated with the polymer dispersed in the base polymer in the rF.

In one embodiment of the present invention, the concentration of the particulate additives associated with each dissolvable polymer dispersed in the dissolvable base polymer in the separated and purified dissolvable polymer is lower than the concentration of the particulate additives associated with the polymer dispersed in the base polymer in the rAHP. In another embodiment of the present invention, the concentration of said particulate additives associated with each dissolvable polymer dispersed in said each dissolvable base polymer in said separated and purified dissolvable polymer is less than about 3 wt %. In yet another embodiment of the present invention, the concentration of said particulate additives associated with each dissolvable polymer dispersed in said each dissolvable base polymer in said separated and purified dissolvable polymer is less than about 1 wt %. In even yet another embodiment of the present invention, the concentration of said particulate additives associated with each dissolvable polymer dispersed in said each dissolvable base polymer in said separated and purified dissolvable polymer is less than about 0.1 wt %. In one embodiment of the present invention, said each dissolvable polymer is essentially free of said particulate additives associated with each dissolvable base polymer in said separated and purified dissolvable polymer.

In one embodiment of the present invention, said separating step is in batch mode. In another embodiment of the present invention, said separating step is in continuous mode.

The dissolving step solvent which is separated in the separating step can be recycled back into the dissolving step, either as is or after purification, using methods well known to those skilled in the art.

Repeating Steps

In one embodiment of the present invention, a method for separating and purifying polymers from a reclaimed product (rP) includes repeating the extracting step, dissolving step, settling step, purifying step, and separating step with each collection of settled particulate additives and said domains of all remaining polymers from the previous repeat of steps b through f to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range until the highest solubilization range until each individual dissolvable polymer from said rP is produced in its separated and purified form and a final collection of settled particulate additives and said domains of all non-dissolvable base polymers is produced. In another embodiment of the present invention, a method for separating and purifying polymers from a reclaimed absorbent hygiene product (rAHP) includes repeating the extracting step, dissolving step, settling step, purifying step, and separating step with each collection of settled particulate additives and said domains of all remaining polymers from the previous repeat of steps b through f to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range to the highest solubilization range until each individual dissolvable polymer from said rAHP is produced in its separated and purified form and a final collection of settled particulate additives and said domains of all non-dissolvable base polymers is produced. In yet another embodiment of the present invention, a method for separating and purifying polymers from a reclaimed film (rF) includes repeating the extracting step, dissolving step, settling step, purifying step, and separating step with each dissolving step collection of settled particulate additives and said domains of all remaining polymers from the previous repeat of the steps to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range to the highest solubilization range until each individual dissolvable polymer from said rF is produced in its separated and purified form and a final collection of settled particulate additives and said domains of all non-dissolvable base polymers is produced.

In one embodiment of the present invention, a method for separating and purifying ADH, TPE, PP, PE, PET, cellulose, and PAA polymers from a reclaimed absorbent hygiene product (rAHP) includes repeating the extracting step, dissolving step, settling step, purifying step, and separating step with each dissolving step collection of settled particulate additives and domains of TPE, PP, PE, PET, cellulose, and PAA polymers from the previous repeat of the steps to produce separated and purified dissolvable polymers via extracting, dissolving, settling, purifying, and separating said TPE, PP, PE, and PET base polymers singularly and in sequence, proceeding from said TPE base polymer to said PP base polymer, then to said PE base polymer, and finally to said PET base polymer until a separated and purified TEP polymer is produced, a separated and purified PP polymer is produced, a separated and purified PE polymer is produced, a separated and purified PET polymer is produced, and a final collection of settled particulate additives and said domains of cellulose and PAA polymers is produced.

In one embodiment of the present invention, said final collection of domains comprises cellulose and PAA polymers. In another embodiment of the present invention, said final collection of domains is separated into said PAA polymer and said cellulose polymer. One of the purposes for separating the PAA polymer and the cellulose polymer is to reuse them in future AHP. In one embodiment of the present invention, said PAA polymer separated from said final collection of domains comprises water at a level exceeding 30 g water/g PAA polymer. In another embodiment of the present invention, said PAA polymer is further dehydrated to less than 1 g water/g PAA polymer via a dehydration process. Non-limiting examples of dehydration processes are contacting the PAA polymer with a salt solution, an acidic solution, a basic solution, and a solvent that forms an azeotrope with water; pressurization; and centrifugation. In yet another embodiment of the present invention, said dehydration process is selected from the group consisting of contacting said PAA polymer with a salt solution, an acidic solution, a basic solution, and a solvent that forms an azeotrope with water; pressurization; centrifugation; and mixtures thereof. Non-limiting examples of solvents that form an azeotrope with water are methanol, ethanol, n-propanol, isopropyl alcohol, n-butanol, isobutanol, and 2-butanol. In even yet another embodiment of the present invention, said solvent is an alcohol selected from the group consisting of methanol, ethanol, n-propanol, isopropyl alcohol, n-butanol, isobutanol, 2-butanol, and mixtures thereof.

In one embodiment of the present invention, said dehydrated PAA polymer is used to produce a new AHP. In another embodiment of the present invention, said PAA polymer is subjected to de-polymerization to produce monomeric acrylic acid (AA) or oligomeric acrylic acid (OAA). In yet another embodiment of the present invention, said AA or OAA is further polymerized to virgin PAA polymer and used to produce a new AHP. Non-limiting examples of de-polymerization of PAA polymers are de-polymerization in the presence of dissolved $CO_2$, de-polymerization using ultrasonics and solar irradiation, thermal degradation, and mechano-chemistry (e.g. applying mechanical forces to achieve de-polymerization).

FIG. 1 is schematic of a process that follows the (a) obtaining step, (b) extracting step, (c) dissolving step, (d) settling step, (e) purifying step, (f) separating step, and the repeating of steps (b) through (f).

Reducing the Size Step

In one embodiment of the present invention, a method for separating and purifying polymers from a reclaimed product (rP) is provided, wherein said rP comprises said polymers and contaminants; wherein said polymer comprises a base polymer, particulate additives associated with said polymer, and extractable materials associated with said polymer; wherein said particulate additives associated with each polymer are dispersed in said base polymer at a concentration; wherein said polymer is selected from the group consisting of a dissolvable polymer, a non-dissolvable polymer, and mixtures thereof; wherein said contaminants comprise particulate matter associated with said contaminants and extractable materials associated with said contaminants; wherein said extractable materials in said rP comprise said extractable materials associated with said polymers and said extractable materials associated with said contaminants; and wherein said extractable materials in said rP are at a concentration in said rP. Said method comprises: (a) obtaining said rP; wherein said rP is selected from the group consisting of post-consumer use products, post-industrial use products, and combinations thereof; (b) reducing the size of said rP to particles with a largest dimension of less than about 10 mm; (c) solids separating each polymer of said rP in a polymer stream, and processing each polymer stream comprising a dissolvable polymer separately in a process comprising: (1) extracting said polymer stream comprising said dissolvable polymer with an extraction solvent at a temperature greater than about 100° C. and at a pressure greater than about 150 psig (1 MPa); wherein said extraction solvent has a standard boiling point less than about 70° C.; whereby an extracted polymer is produced; and wherein said extractable materials have a concentration in said extracted polymer which is lower than said concentration of said extractable materials in said rP; (2) dissolving said dissolvable polymer by contacting said extracted polymer with a dissolving step solvent at a temperature range and a pressure range sufficient to cause said dissolvable base polymer to solubilize in said dissolving step solvent; whereby producing an initial suspension; and wherein said initial suspension comprises a suspension of said particulate additives associated with said first dissolvable polymer; (3) settling said initial suspension at a temperature range and a pressure range sufficient to produce a collection of settled particulate additives and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution; (4) purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution; (5) separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rP.

The reducing the size step can be implemented in a variety of pieces of equipment, as it is well known to those skilled in the art. Non-limiting examples of pieces of equipment for this step are shredders, crushers, grinders, pulverizers, choppers, shear slitters, etc.

In one embodiment of the present invention, said particles have a largest dimension of less than about 50 mm. In another embodiment of the present invention, said particles have a largest dimension of less than about 25 mm. In yet another embodiment of the present invention, said particles have a largest dimension of less than about 10 mm. In even yet another embodiment of the present invention, said particles have a largest dimension of less than about 5 mm. In one embodiment of the present invention, said particles have a largest dimension of less than about 1 mm.

Solids Separating Step

In one embodiment of the present invention, said solids separating step comprises separating said rP particles into said polymers with a gravimetric technique. In another embodiment of the present invention, said gravimetric technique comprises a series of float/sink tanks each filled with a liquid that has a density between the densities of the polymers that are fed into the tank and separated at the exit of the tank. For example, to separate PP from PET, a stream containing PP and PET particles is fed into a tank containing water (with density of 1 g/mL), where PP, with density of about 0.905 g/mL, will float and PET, with density of about 1.38 g/mL, will sink. Similarly, to separate PP from PE, a stream containing PP and PE particles is fed into a tank containing 40 wt % isopropyl alcohol in water (with density 0.926 g/mL), where PP, with density of about 0.905 g/mL, will float and PE, with density of about 0.95 g/mL, will sink.

In another embodiment of the present invention, said solids separating step comprises separating said rP particles into said polymers with an optical technique.

Figure 2:
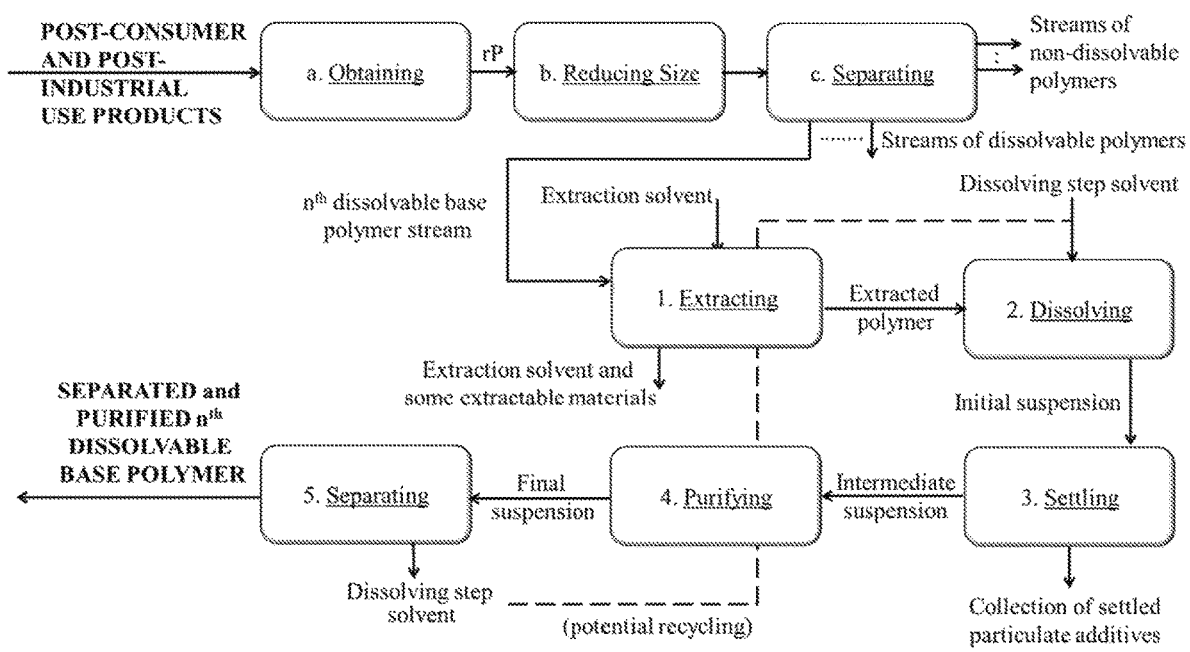
FIG. 2 is a block flow diagram showing the major steps of another embodiment of the present invention.

FIG. 2 is schematic of a process that follows the (a) obtaining step, (b) reducing size step, (c) solids separating step, (1) extracting step, (2) dissolving step, (3) settling step, (4) purifying step, and (5) separating step for each polymer stream that comprises a dissolvable polymer.

III Test Methods

The test methods described herein are used to measure the effectiveness of various methods for purifying polymers. Specifically, the methods described demonstrate the effectiveness of a given purification method at improving color and translucency/clarity (i.e. making the color and opacity of the reclaimed polymer closer to that of an uncolored virgin polymer), reducing or eliminating elemental contamination (i.e. removing heavy metals), reducing or eliminating non-combustible contamination (i.e. inorganic fillers), reducing or eliminating volatile compounds (especially volatile compounds that contribute to the malodor of reclaimed products), and reducing or eliminating polymeric contamination (e.g. polyethylene contamination in polypropylene).

Color and Opacity Measurement:

The color and opacity/translucency of a polymer are important parameters that determine whether or not a polymer can achieve the desired visual aesthetics of an article manufactured from the polymer. For example, reclaimed polypropylene, especially post-consumer derived reclaimed polypropylene, is typically dark in color and opaque due to residual pigments, fillers, and other contamination. Thus, color and opacity measurements are important parameters in determining the effectiveness of a method for purifying polymers.

Prior to color measurement, samples of either polymeric powders or pellets are compression molded into 30 mm wide×30 mm long×1 mm thick square test specimens (with rounded corners). Powder samples are first densified at room temperature (ca. 20-23° C.) by cold pressing the powder into a sheet using clean, un-used aluminum foil as a contact-release layer between stainless steel platens. Approximately 0.85 g of either cold-pressed powder or pellets is then pressed into test specimens on a Carver Press Model C (Carver, Inc., Wabash, Ind. 46992-0554 USA) pre-heated to 200° C. using aluminum platens, unused aluminum foil release layers, and a stainless steel shim with a cavity corresponding to aforementioned dimensions of the square test specimens. Samples are heated for 5 min prior to applying pressure. After 5 min, the press is then compressed with at least 2 tons (1.81 metric tons) of hydraulic pressure for at least 5 s and then released. The molding stack is then removed and placed between two thick flat metal heat sinks for cooling. The aluminum foil contact release layers are then peeled from the sample and discarded. The flash around the sample on at least one side is peeled to the mold edge and then the sample is pushed through the form. Each test specimen is visually evaluated for voids/bubble defects and only samples with no defects in the color measurement area (0.7" (17.78 mm) diameter minimum) are used for color measurement.

The color of each sample is characterized using the International Commission on Illumination (CIE) L*, a*, b* three dimensional color space. The dimension L* is a measure of the lightness of a sample, with L*=0 corresponding to the darkest black sample and L*=100 corresponding to the brightest white sample. The dimension a* is a measure of the red or green color of a sample with positive values of a* corresponding with a red color and negative values of a* corresponding with a green color. The dimension b* is a measure of the blue or yellow color of a sample with positive values of b* corresponding with a blue color and negative values of b* corresponding with a yellow color. The L*a*b* values of each 30 mm wide×30 mm long×1 mm thick square test specimen sample are measured on a HunterLab model LabScan XE spectrophotometer (Hunter Associates Laboratory, Inc., Reston, Va. 20190-5280, USA). The spectrophotometer is configured with D65 as the standard illuminant, an observer angle of 10°, an area diameter view of 1.75" (44.45 mm), and a port diameter of 0.7" (17.78 mm).

The opacity of each sample, which is a measure of how much light passes through the sample (i.e. a measure of the sample's translucency), is determined using the aforementioned HunterLab spectrophotometer using the contrast ratio opacity mode. Two measurements are made to determine the opacity of each sample. One to measure the brightness value of the sample backed with a white backing, $Y_{WhiteBacking}$, and one to measure the brightness value of the sample backed with a black backing, $Y_{BlackBacking}$. The opacity is then calculated from the brightness values using the following Equation 3:

$$\% \text{ Opacity} = \frac{Y_{Black\ Backing}}{Y_{White\ Backing}} * 100 \qquad \text{Equation 3}$$

Elemental Analysis:

Many sources of reclaimed polymers have unacceptably high concentrations of heavy metal contamination. The presence of heavy metals, for example lead, mercury, cadmium, and chromium, may prevent the use of reclaimed polymers in certain applications, such as food or drug contact applications or medical device applications. Thus, measuring the concentration of heavy metals is important when determining the effectiveness of a method for purifying polymers.

Elemental analysis is performed using Inductively Coupled Plasma Mass Spectrometry (ICP-MS). Test solutions were prepared in n=2 to n=6 depending on sample availability by combining ~0.25 g sample with 4 mL of concentrated nitric acid and 1 mL of concentrated hydrofluoric acid (HF). The samples are digested using an Ultrawave Microwave Digestion protocol consisting of a 20 min ramp to 125° C., a 10 min ramp to 250° C., and a 20 min hold at 250° C. Digested samples are cooled to room temperature. The digested samples are diluted to 50 mL after adding 0.25 mL of 100 ppm Ge and Rh as the internal standard. In order to assess accuracy of measurement, pre-digestion spikes are prepared by spiking virgin polymer. Virgin polymer spiked samples are weighed out using the same procedure mentioned above and spiked with the appropriate amount of each single element standard of interest, which included the following: Na, Al, Ca, Ti, Cr, Fe, Ni, Cu, Zn, Cd, and Pb. Spikes are prepared at two different levels: a "low level spike" and a "high level spike". Each spike is prepared in triplicate. In addition to spiking virgin polymer, a blank is also spiked to verify that no errors occurred during pipetting and to track recovery through the process. The blank spiked samples are also prepared in triplicate at the two different levels and are treated in the same way as the spiked virgin polymer and the test samples. A 9 point calibration curve is made by making 0.05, 0.1, 0.5, 1, 5, 10, 50, 100, and 500 ppb solutions containing Na, Al, Ca, Ti, Cr, Fe, Ni, Cu, Zn, Cd, and Pb. All calibration standards are prepared by dilution of neat standard reference solutions and 0.25 mL of 100 ppm Ge and Rh as the internal standard with 4 mL of concentrated nitric and 1 mL of concentrated HF. Prepared standards, test samples, and spiked test samples are analyzed using an Agilent's 8800 ICP-QQQMS, optimized according to manufacturer recommendations. The monitored m/z for each analyte and the collision cell gas that as used for analysis is as follows: Na, 23 m/z, $H_2$; Al, 27 m/z, $H_2$; Ca, 40 m/z, $H_2$; Ti, 48 m/z, $H_2$; Cr, 52 m/z, He; Fe, 56 m/z, $H_2$; Ni, 60 m/z; no gas; Cu, 65 m/z, no gas; Zn, 64 m/z, He; Cd, 112 m/z; $H_2$; Pb, sum of 206≥206, 207≥207, 208≥208 m/z, no gas; Ge, 72 m/z, all modes; Rh, 103 m/z, all modes. Ge is used as an internal standard for all elements <103 m/z and Rh is used for all elements >103 m/z.

Residual Ash Content:

Many sources of reclaimed polymers contain various fillers, for example calcium carbonate, talcum, and glass fiber. While useful in the original application of the reclaimed polymers, these fillers alter the physical properties of a polymer in way that may be undesired for the next application of the reclaimed polymer. Thus, measuring the amount of filler is important when determining the effectiveness of a method for purifying polymers.

Thermogravimetric analysis (TGA) is performed to quantify the amount of non-combustible materials in the sample (also sometimes referred to as Ash Content). About 5-15 mg of sample is loaded onto a platinum sample pan and heated to 700° C. at a rate of 20° C./min in an air atmosphere in a TA Instruments model Q500 TGA instrument. The sample is held isothermal for 10 min at 700° C. The percentage residual mass is measured at 700° C. after the isothermal hold.

Odor Analysis:

Odor sensory analysis is performed by placing about 3 g of each sample in a 20 mL glass vial and equilibrating the sample at room temperature for at least 30 min. After equilibration, each vial is opened and the headspace is sniffed (bunny sniff) by a trained grader to determine odor intensity and descriptor profile. Odor intensity is graded according to the following scale: 5=Very Strong; 4=Strong; 3=Moderate; 2=Weak to Moderate; 1=Weak; and 0=No odor.

Polymeric Contamination Analysis:

Many sources of reclaimed polymers, especially reclaimed polypropylene originating from mixed-stream sources, may contain undesired polymeric contamination. Without wishing to be bound by any theory, polymeric contamination, for example polyethylene contamination in polypropylene, may influence the physical properties of the polymer due to the presence of heterogeneous phases and the resulting weak interfaces. Furthermore, the polymeric contamination may also increase the opacity of the polymer and have an influence on the color. Thus, measuring the amount of polymeric contamination is important when determining the effectiveness of a method for purifying polymers.

Semi-crystalline polymeric contamination is evaluated using Differential Scanning Calorimetry (DSC). To measure the amount of PE contamination in PP, a set of five PE/PP blends are prepared with 2, 4, 6, 8, and 10 wt % of Formolene® HB5502F HDPE (Formosa Plastics Corporation, USA) in Pro-fax 6331 polypropylene (LyondellBasell Industries Holdings, B.V.). Approximately 5-15 mg of each sample is sealed in an aluminum DSC pan and analyzed on a TA Instruments model Q2000 DSC with the following method: Equilibrate at 30.00° C.; Ramp 20.00° C./min to 200.00° C.; Mark end of cycle 0; Ramp 20.00° C./min to 30.00° C.; Mark end of cycle 1; Ramp 20.00° C./min to 200.00° C.; Mark end of cycle 2; Ramp 20.00° C./min to 30.00° C.; Mark end of cycle 3; Ramp 5.00° C./min to 200.00° C.; and Mark end of cycle 4.

The enthalpy of melting for the HDPE peak around 128° C. is calculated for each sample of known HDPE content using the 5.00° C./min DSC thermogram. A linear calibration curve is established via plotting enthalpy of melting versus known HDPE concentration (wt %).

Samples, having unknown PE content, are analyzed using the same aforementioned DSC equipment and method. PE content is calculated using the aforementioned calibration curve. The specific HDPE used to generate the calibration curve will more than likely have a different degree of crystallinity than the polyethylene (or polyethylene blend) contamination that may be present in a reclaimed polypropylene sample. The degree of crystallinity may independently influence the measured enthalpy of melting for polyethylene and thus influence the resulting calculation of polyethylene content. However, the DSC test method described herein is meant to serve as a relative metric to compare the effectiveness of different methods to purify polymers and is not meant to be a rigorous quantification of the polyethylene content in a polymer blend. While the aforementioned method described the measurement of PE contamination in PP, this method may be applied to measurement of other semi-crystalline polymers using different temperature ranges and peaks in the DSC thermogram. Furthermore, alternative methods, such as nuclear magnetic resonance (NMR) spectroscopy, may also be used to measure the amount of both semi-crystalline and amorphous polymeric contamination in a sample.

Every document cited herein, including any cross reference or related patent or patent application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggest or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modification can be made without departing from the spirit and scope of the invention. It is therefore intended to cover in the appended claims all such changes and modification that are within the scope of the present invention.

What is claimed is:

1. A method for separating and purifying polymers from a reclaimed product (rP), wherein said rP comprises one or more polymers and contaminants; a polymer comprises a first dissolvable base polymer, particulate additives associated with the polymer, and extractable materials associated with the polymer; and said particulate additives associated with a polymer are dispersed in said base polymer at a concentration; wherein said method comprises:

a. obtaining said rP; wherein said rP is selected from the group consisting of post-consumer use products, post-industrial use products, and combinations thereof;

b. extracting said rP with an extraction solvent at a temperature greater than about 100° C. and at a pressure greater than about 150 psig (1 MPa); wherein said extraction solvent has a standard boiling point less than about 70° C.; whereby an extracted rP (erP) is produced; and wherein said extractable materials have a concentration in said erP which is lower than said concentration of said extractable materials in said rP;

c. dissolving a first dissolvable base polymer of said rP by contacting said erP with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable base polymer, in a first dissolvable base polymer solution; and wherein said first dissolvable base polymer has a solubilization range below the solubilization range of the remaining dissolvable base polymers;

d. settling said initial suspension at a temperature range and a pressure range sufficient to produce a collection of settled particulate additives, and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution;

e. purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution;

f. separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rP; and g. repeating steps b (extracting step), c (dissolving step), d (settling step), e (purifying step), and f (separating step) with each collection of settled particulate additives from the previous repeat of steps b through f to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range to the highest solubilization range until each individual dissolvable polymer from said rP is produced in its separated and purified form and a final collection of settled particulate additives is produced;

wherein said polymer is selected from the group consisting of a dissolvable polymer, a non-dissolvable polymer, and mixtures thereof; wherein said contaminants comprise particulate matter associated with said contaminants and extractable materials associated with said contaminants; wherein said extractable materials in said rP comprise said extractable materials associated with said polymers and said extractable materials associated with said contaminants; and wherein said extractable materials in said rP are at a concentration in said rP.

2. The method of claim 1, wherein said rP is a reclaimed film (rF).

3. The method of claim 2, wherein said rF comprises at least 2 polymers.

4. The method of claim 1, wherein said rP is a reclaimed absorbent hygiene product (rAHP).

5. The method of claim 4, wherein said method comprises:

h. obtaining an rAHP; wherein said rAHP is selected from the group consisting of post-consumer use products, post-industrial use products, and combinations thereof;

i. extracting said rAHP with an extraction solvent at a temperature greater than about 100° C. and at a pressure greater than about 150 psig (1 MPa); wherein said extraction solvent has a standard boiling point less than about 70° C.; whereby an extracted rAHP (erAHP) is produced; and wherein said extractable materials have a concentration in said erAHP which is lower than said concentration of said extractable materials in said rAHP;

j. dissolving a first dissolvable base polymer of said rAHP by contacting said erAHP with a dissolving step solvent at a temperature range and a pressure range sufficient to cause said first dissolvable base polymer to solubilize in said dissolving step solvent; whereby producing an initial suspension; wherein said initial suspension comprises a suspension of said particulate additives associated with said first dissolvable polymer, in a first dissolvable base polymer solution; and wherein said first dissolvable base polymer has a solubilization range below the solubilization range of the remaining dissolvable base polymers;

k. settling said initial suspension at a temperature range and a pressure range sufficient to produce a collection of settled particulate additives and an intermediate suspension; wherein said collection of settled particulate additives comprises particulate additives associated with said first dissolvable polymer; and wherein said intermediate suspension comprises a suspension of non-settled particulate additives associated with said first dissolvable polymer in said first dissolvable base polymer solution;

l. purifying said intermediate suspension with a solid medium at a temperature range and a pressure range sufficient to produce a final suspension; wherein a fraction of said particulate additives associated with said first dissolvable polymer is retained by said solid medium; and wherein said final suspension comprises a suspension of non-retained particulate additives associated with said first dissolvable polymer in said first dissolvable base polymer solution;

m. separating said dissolving step solvent from said final suspension at a temperature range and a pressure range sufficient to produce a separated and purified first dissolvable polymer; and wherein said separated and purified first dissolvable polymer comprises said first dissolvable base polymer and said particulate additives associated with said first dissolvable polymer dispersed in said separated and purified first dissolvable polymer at a concentration lower than said concentration of said particulate additives associated with said first dissolvable polymer in said first dissolvable polymer in said rAHP; and n. repeating steps b (extracting step), c (dissolving step), d (settling step), e (purifying step), and f (separating step) with each collection of said settled particulate additives and said domains of all remaining polymers from the previous repeat of steps b through f to produce separated and purified dissolvable polymers via extracting, dissolving, settling, purifying, and separating said dissolvable base polymers singularly and in sequence, proceeding from said second dissolvable polymer through the additional dissolvable polymers, the sequence proceeding from the dissolvable base polymer with the lowest solubilization range to the highest solubilization range until each individual dissolvable polymer from said rAHP is produced in its separated and purified form and a final collection of settled particulate additives is produced.

6. The method of claim 5, wherein said rAHP is selected from the group consisting of baby diaper, feminine protection product, adult incontinence product, and mixtures thereof.

7. The method of claim 5, wherein said method further comprises sterilizing said rAHP after said obtaining step.

8. The method of claim 5, wherein said method further comprises reducing the size of said rAHP after said obtaining step and before said extracting step.

9. The method of claim 8, wherein said reducing step comprises milling, cutting, shearing, or mixtures thereof.

10. The method of claim 5, wherein said erAHP is essentially free of said extractable materials.

11. The method of claim 5, wherein said dissolvable polymers are selected from the group consisting of polypropylene (PP), polyethylene (PE), poly(ethylene terephthalate) (PET), adhesives (ADH), thermoplastic elastomers (TPE), and mixtures thereof.

12. The method of claim 11, wherein said first dissolvable polymer is ADH, said second dissolvable polymer is TPE, said third dissolvable polymer is PP, said fourth dissolvable polymer is PE, and said fifth dissolvable polymer is PET.

13. The method of claim 5, wherein said particulate additives associated with each dissolvable polymer are selected from the group consisting of clarifiers, flame retardants, fillers, reinforcements, antacids, stabilizers, antioxidants, slip agents, antiblocking agents, lubricants, mold release agents, nucleating agents, pigments, and mixtures thereof.

14. The method of claim 5, wherein said non-dissolvable polymers are selected from the group consisting of cellulose, hemicellulose, lignin, poly(acrylic acid) (PAA), and mixtures thereof.

15. The method of claim 14, wherein said non-dissolvable polymers are cellulose and PAA.

16. The method of claim 14, wherein said final collection of domains of non-dissolvable base polymers comprises cellulose and PAA polymers.

17. The method of claim 16, wherein said PAA polymer is separated from said cellulose.

* * * * *